United States Patent [19]

Minagawa et al.

[11] 4,219,463
[45] Aug. 26, 1980

[54] STABILIZERS FOR SYNTHETIC POLYMERS COMPRISING 2,2,6,6-TETRAMETHYL-4-PIPERIDYL CARBOXYLIC ACID ESTER, β-THIOALKYL PROPIONIC ACID ESTER AND PHENOL

[75] Inventors: Motonobu Minagawa, Kosigaya; Naohiro Kubota, Urawa; Tohru Haruna, Okegawa; Toshihiro Shibata, Urawa, all of Japan

[73] Assignee: Argus Chemical Corporation, Brooklyn, N.Y.

[21] Appl. No.: 852,254

[22] Filed: Nov. 17, 1977

[30] Foreign Application Priority Data

Dec. 10, 1976 [JP] Japan ............................ 51-14909

[51] Int. Cl.² .................... C08K 5/34; C08K 5/35; C08K 5/36
[52] U.S. Cl. ............... 260/45.8 N; 252/403; 252/404; 252/405; 252/406; 260/45.8 NT; 260/45.8 NZ; 260/45.85 B; 260/45.85 H; 260/45.95 H; 260/45.95 R
[58] Field of Search ............ 260/45.85 H, 45.8 N, 260/45.8 NT, 45.8 NZ, 293.63, 45.8 NP; 544/222

[56] References Cited

U.S. PATENT DOCUMENTS

| | | | |
|---|---|---|---|
| 3,629,194 | 12/1971 | Onishi et al. | 260/45.85 H |
| 3,758,549 | 9/1973 | Dexter et al. | 260/45.85 H |
| 3,840,494 | 10/1974 | Murayama et al. | 260/45.8 N |
| 3,925,376 | 12/1975 | Chalmers et al. | 260/45.8 NT |
| 3,966,675 | 6/1976 | Schurdak et al. | 260/45.85 H |
| 3,992,390 | 11/1976 | Holt et al. | 260/45.8 N |
| 4,016,168 | 4/1977 | Murayama et al. | 260/45.8 NZ |
| 4,035,323 | 7/1977 | Mathis | 260/45.8 N |
| 4,075,165 | 2/1978 | Soma et al. | 260/45.8 NP |
| 4,093,586 | 6/1978 | Stephen | 260/45.8 NT |
| 4,108,829 | 8/1978 | Cassandrini et al. | 260/45.8 NT |
| 4,110,306 | 8/1978 | Minagawa et al. | 260/45.8 NT |
| 4,118,369 | 10/1978 | Minagawa et al. | 260/45.8 NZ |
| 4,124,564 | 11/1978 | Minagawa et al. | 260/45.8 NP |

*Primary Examiner*—Hosea E. Taylor
*Assistant Examiner*—R. A. White

[57] ABSTRACT

Stabilizers for organic polymeric materials are provided, comprising a 2,2,6,6-tetramethyl-4-piperidyl carboxylic acid ester having the general formula:

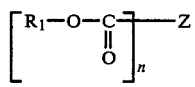

wherein:
$R_1$ is selected from the group consisting of

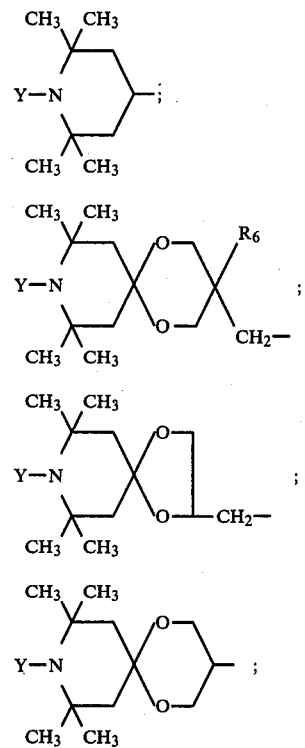

Y is selected from the group consisting of hydrogen and O;
$R_6$ is lower alkyl having from one to two carbon atoms;
n is selected from the group consisting of 1, 2, 3 and 4; and
Z is an organic radical having a valence from 1 to 4, the valence positions being taken by

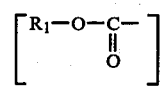

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, and amino- and hydroxy-substituted such radicals; a β-thioalkyl propionic acid ester of a polyhydric alcohol, and a phenolic antioxidant.

36 Claims, No Drawings

STABILIZERS FOR SYNTHETIC POLYMERS COMPRISING 2,2,6,6-TETRAMETHYL-4-PIPERIDYL CARBOXYLIC ACID ESTER, β-THIOALKYL PROPIONIC ACID ESTER AND PHENOL

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride polyurethanes, and polyamides. These compounds have the general formula:

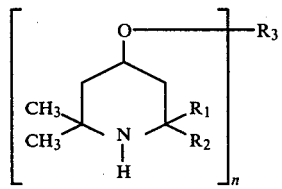

or a salt thereof.

In the above formula:

$R_1$ and $R_2$ which may be the same or different, each are an alkyl group such as methyl, ethyl, isopropyl or dodecyl, or they form, together with the carbon atom to which they are attached, a saturated alicyclic group such as:

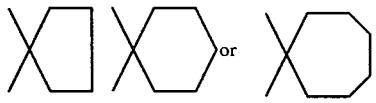

or a group of the formula

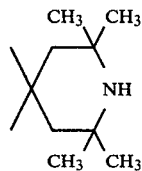

n is an integer of 1 to 3 inclusive: and $R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

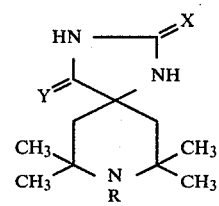

wherein R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

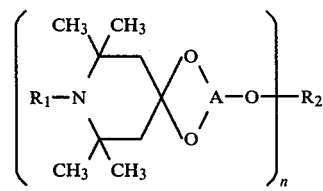

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group; n is an integer of 1 to 4;

when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

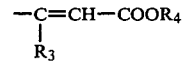

in which $R_3$ represents hydrogen atom, a lower alkyl group or phenyl group and $R_4$ represents an alkyl group;

when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

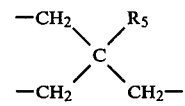

in which $R_5$ represents hydrogen atom or a lower alkyl group or, when n is 1, $R_5$ may represent together with $R_2$ a group

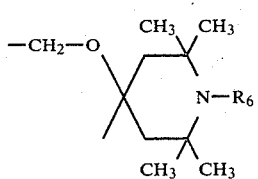

in which $R_6$ represents the same group as defined in $R_1$ and may be the same or different from $R_1$, or a group

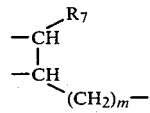

in which m is 1 or 2 and $R_7$ represents hydrogen atom or, when n and m are 1, $R_7$ represents methylene group together with $R_2$.

Murayama et al U.S. Pat. No. 3,840,494, patented Oct. 8, 1974 provides acid esters of 4-piperidinol derivatives having the formula:

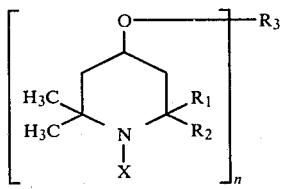

wherein $R_1$ and $R_2$ may be the same or different and represent an alkyl group of one to four carbon atoms or they may form, together with the carbon atom to which they are attached, a saturated alicyclic group or the group of the formula:

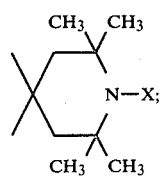

X is hydrogen atom, oxygen free radical (—O·) or an alkyl group of one to four carbon atoms;

n is an integer of 1 through 4 inclusive; and $R_3$ represents, when n is 1, and acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, a tetraacyl group derived from an aromatic tetracarboxylic acid or a tetravalent group obtained by eliminating four hydroxyl groups from orthosilicic acid.

Murayama et al U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidino spiro derivatives having the formula:

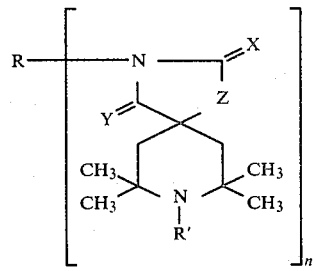

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R" in which R" is hydrogen atom, an alkyl group or a substituted alkyl group;

Z represents oxygen atom or a group of the formula >N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group; when n is 2, an alkylene group, an alkenylene group, an arylene group, a substituted arylene group, an aralkylene group, an alkylenediphenylene group, a bis-(acyloxykylene) group, an alkylene-bis-(oxycarbonylalkyl) group, a dialkylene ether group or a diphenylene ether group; when n is 3, an alkanetriyl group, a tris-(acyloxyalkylene) group, an alkane-tris-(oxycarbonylalkyl) group or a group of the group

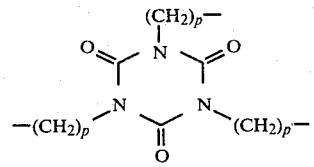

in which p is an integer of 1 through 8 inclusive; and when n is 4, an alkane tetrayl group, a tetrakis-(acyloxyalkylene) group or an alkanetetrakis(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

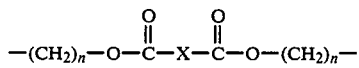

in which n is an integer of 1 or 2 and X is an alkylene group, or o-, m- or p-phenylene group or the carbon atoms of CO groups may be directly joined in the absence of X or a group of the formula:

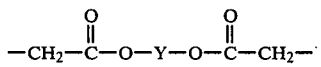

in which Y is an alkylene group or o-, m- or p-phenylene group.

Ramey et al U.S. Pat. Nos. 3,875,169 patented Apr. 1, 1975 and 3,991,012 patented Nov. 9, 1976 provide bicyclic hindered amines of the formula:

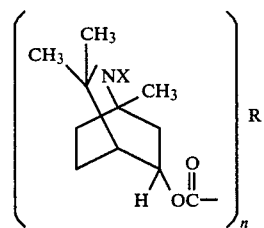

wherein
X is H, O, or OH,
n is 1 or 2, and
(a) when n is 1, R is straight- or branched-chain alkyl having one to twenty carbon atoms, phenyl or phenyl substituted by one or more lower alkyl groups, and
(b) when n is 2, R is straight- or branched-chain alkylene having one to twenty carbon atoms, phenylene or phenylene substituted by one or more lower alkyl groups.

Preferred compounds of formula I are those wherein X is H or O; and n is 1 or 2, and
(a) when n is 1, R is n-alkyl having one to twenty atoms, and
(b) when n is 2, R is n-alkylene having one to twelve carbon atoms.

Ramey et al U.S. Pat. Nos. 3,907,803 patented Sept. 23, 1975 and 4,001,181 patented Jan. 4, 1977 provide hindered piperidine carboxamide acids and metal salts thereof of the formula:

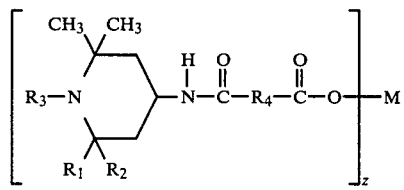

wherein
$R_1$ and $R_2$ independently of each other are straight- or branched-chain lower alkyl having one to six carbon atoms, or together with the carbon to which they are bound form a cyclopentyl or cyclohexyl ring, which is unsubstituted or substituted with a methyl group,
$R_3$ is hydrogen, alkyl having one to twelve carbon atoms, β-methoxyethyl alkenyl having three or four carbon atoms, propargyl, benzyl, or alkyl-substituted benzyl,
$R_4$ is straight- or branched-chain alkylene having one to eight carbon atoms, phenylene, phenylene substituted with one or more alkyl groups, or the group —$(CH_2)_mY(CH_2)_n$—, wherein Y is oxygen or sulfur and m and n independently of each other are an integer of from 1 to 3,
M is hydrogen or a metal selected from the group consisting of barium, nickel, manganese, calcium, zinc, iron, sodium, cobalt, tin, dialkyl tin, and
z has a value of from 1 to 4, the value of z being the same as the available valence of M.

Ramey et al U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of U.S. Pat. No. 3,899,491 have the formula:

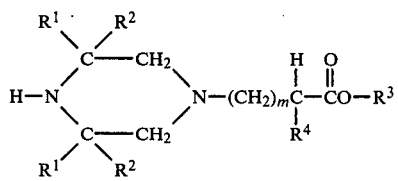

wherein
$R^1$ and $R^2$ are methyl or together with the carbon to which they are bound form a mono-cyclic ring system having five or six carbon atoms;
$R^3$ is an alkyl group of from one to twenty atoms;
$R^4$ is hydrogen or methyl, and
m is 0 or 1.

The substituted piperazinodiones of U.S. Pat. No. 3,920,659 have the formula:

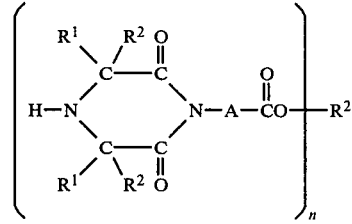

wherein
$R^1$ and $R^2$ are independently of each other methyl or ethyl or together with the carbon to which they are bound form a cyclopentyl or cyclohexyl ring, which is unsubstituted or substituted with a methyl group;
n is an integer of from 1 to 2;
when n is 1, $R^3$ is an alkyl group of from one to twenty carbon atoms;
when n is 2, $R^3$ is an alkylene group of from two to eight carbon atoms; and
A is a straight or branched chain (lower) alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

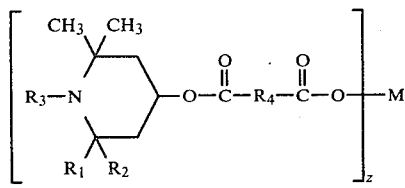

wherein

R₁ and R₂ independently of each other are straight- or branched-chain alkyl having from one to six carbon atoms, or together with the carbon to which they are bound form a cyclopentyl or cyclohexyl ring, which is unsubstituted or substituted with a methyl group;

R₃ is hydrogen, alkyl having one to twelve carbon atoms, β-methoxy- ethyl, alkenyl having three or four carbon atoms, propargyl, benzyl or alkyl-substituted benzyl;

R₄ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al U.S. pat. No. 3,939,163 patented Feb. 17, 1976 disclose closely similar compounds in which R₄ is alkylene having from one to four carbon atoms.

Randell et al U.S. Pat. No. 3,939,170 patented Feb. 17, 1976 disclose dehydropyridinyl sulphides, sulphoxides and sulphones having the formula:

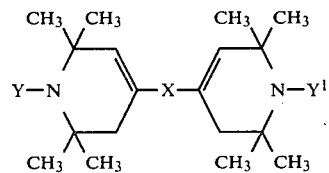

wherein X is S, SO or SO₂ and Y and Y¹ are the same or different and each is H, OH, O— or a straght- or branched alkyl residue having from one to four carbon atoms, and salts thereof when Y and Y¹ are other than O—.

Randell et al in published patent application No. B408,123 published Apr. 13, 1976 disclose substituted piperidine-4-ols having the formula:

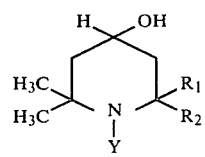

wherein R₁ and R₂ are the same or different and each is a straight- or branched alkyl residue having from one to twelve carbon atoms, or R₁ and R₂, together with the carbon atom to which they are attached, form a cycloalkyl residue having from five to twelve carbon atoms or the group:

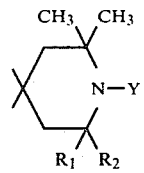

wherein R₁ and R₂ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —CH₂X wherein X is the group

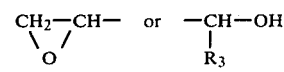

wherein R₃ is hydrogen, a methyl or phenyl residue, the group

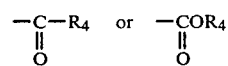

wherein R₄ is an alkyl residue having from one to twenty carbon atoms.

Cook U.S. Pat. No. 3,929,804 patented Dec. 30, 1975 discloses 4-piperidine acetamide compounds having the formula:

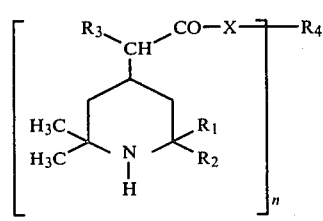

wherein

R₁ and R₂ are the same or different and each is a straght- or branched alkyl residue having from one to twelve carbon atoms, or R₁ and R₂, together with the carbon atom to which they are attached form a cycloalkyl group having from five to twelve carbon atoms;

R₃ is hydrogen, a straight- or branched alkyl residue having from one to four carbon atoms, an aralkyl residue having from seven to nine carbon atoms or a cycloalkyl group having from five or six carbon atoms;

R₄ is a metal ion or a hydrocarbyl residue having from two to twenty carbon atoms and being either unsubstituted or substituted by halogen or interrupted by one or more oxygen or sulphur atoms;

X is —O—, —S—, or >NR₅, wherein R₅ has the same significance as R₃; and n is 2, 3 or 4;

as well as salts of the amine function of the compounds of formula I.

Cook U.S. Pat. No. 3,030,168 patented Feb. 17, 1976 discloses closely similar compounds having a Y substituent on the piperidyl nitrogen atom, Y being alkyl, alkenyl, aralkyl or a group $$R_7-CH-CH_2- \atop \phantom{R_7-}OH$$

wherein $R_7$ is hydrogen, alkyl or phenyl.

Randell et al U.S. Pat. No. 3,939,170, patented Feb. 17, 1976 provides di-4-(3,4-dehydro-2,2,6,6-tetramethyl piperidinyl) sulphides, sulphoxides and sulphones having the formula:

I wherein X is S, SO or $SO_2$ and Y and $Y^1$ are the same or different and each is H, OH, O· or a straight- or branched-alkyl residue having from one to four carbon atoms, and salts thereof when Y and $Y^1$ are other than O·.

Preferably X is S.

Smith et al U.S. Pat. No. 3,954,779, patented May 4, 1976 provides 4-(4'-hydroxycyclohexyl)2,2,6,6-tetramethyl piperidines and derivatives thereof having the formula:

and salts thereof, wherein $R_1$, $R_2$, $R_3$ and $R_4$ are the same or different and each is hydrogen, an alkyl residue having from one to nine carbon atoms, a cycloalkyl residue having from five to fourteen carbon atoms or a cycloalkyl-alkyl residue having from seven to fourteen carbon atoms;

Y is hydrogen;

O an alkyl residue having from one to four carbon atoms, or an aralkyl residue having from seven to twelve carbon atoms; and Z is hydrogen, an unsubstituted or substituted alkyl residue having from one to twenty carbon atoms, an alkenyl or alkynyl residue having from two to twenty carbon atoms, a cycloalkyl residue having from five to twelve carbon atoms, an aralkyl residue having from seven to twelve carbon atoms, an aryl residue having from six to twelve carbon atoms, or the group having the formula: $-COZ_1$ wherein $Z_1$ has the same significance as Z as hereinbefore defined or $Z_1$ is a group $-NR_5R_6$ wherein $R_5$ is hydrogen or an alkyl residue having from one to four carbon atoms and $R_6$ is hydrogen, an alkyl residue having from one to twenty carbon atoms, a cycloalkyl residue having from five to twelve carbon atoms, an aralkyl residue having from seven to twelve carbon atoms or an aryl residue having from six to twelve carbon atoms.

Cook U.S. Pat. No. 3,959,291, patented May 25, 1976 provides derivatives of substituted 2-piperidinyl-4'-ethyl alcohol having the formula:

and salts thereof, wherein $R_1$ and $R_2$ are the same or different and each is an alkyl residue having from one to twelve carbon atoms, or $R_1$ and $R_2$, together with the carbon atom to which they are bound, form a cycloalkyl residue having from five to twelve carbon atoms in the ring;

Y is O, hydrogen, a straight- or branched-alkyl residue having from one to twenty carbon atoms, an alkenyl or alkynyl residue having from three to twelve carbon atoms, an aralkyl residue having from seven to twelve carbon atoms or a group having the formula:

$$-CH_2-CH-OH \atop \phantom{-CH_2-}R$$

wherein

R is hydrogen, or a methyl or phenyl residue, and $R_3$ is hydrogen, or a straight- or branched-chain alkyl residue having from one to twelve carbon atoms.

Cook U.S. Pat. No. 3,971,795, patented July 27, 1976 provides N-substituted piperidinylidene derivatives having the formula:

I wherein n is 1, 2, 3 or 4,

Y is hydrogen or a straight- or branched-alkyl residue having from one to twelve carbon atoms, an alkenyl residue having from three to twelve carbon atoms or an aralkyl residue having from seven to twelve carbon atoms and $R_1$ and $R_2$ are the same or different and each is a straight- or branched- alkyl residue having from one to twelve carbon atoms, or $R_1$ and $R_2$ together with the carbon atom to which they are attached form a cycloalkyl group having from five to twelve carbon atoms;

$R_3$ is hydrogen, a straight- or branched-alkyl residue having from one to four carbon atoms, an aralkyl residue having from seven to twelve carbon atoms, a cycloalkyl group having five or six carbon atoms;

$R_4$ is a hydrocarbyl residue having from one to twenty carbon atoms being either unsubstituted or substituted by halogen, or interrupted by one or more oxygen or sulphur atoms or $R_4$ is a metal ion, or, when n is 1, $R_4$, in addition, is hydrogen or has the structure:

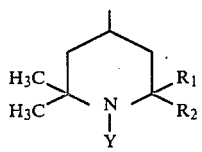

wherein

Y, $R_1$ and $R_2$ have their previous significance,

X is —O—, —S— or >$NR_5$ wherein $R_5$ has the same significance as $R_3$ or when n is 1 in addition $R_5$ and $R_4$ together with the nitrogen atom to which they are bound form a heterocyclic residue having from four to ten carbon atoms;

as well as salts of the amine function of the compound of formula I.

Murayama et al U.S. Pat. No. 3,975,357, patented Aug. 17, 1976 provides 1-substituted piperidine derivatives having the formula:

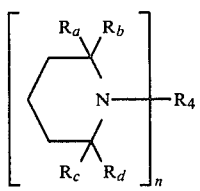
(I)

In the above formula, n represents 1 or 2.

$R_1$ represents when n=1, oxyl radical, hydroxy group, an alkyl group, a substituted alkyl group, an alkenyl group, an alkynyl group, an aralkyl group, a substituted aralkyl group or an acyl group, when n=2, an alkylene group (the alkylene chain may optionally be interrupted by an oxygen atom), 2-butenylene group, a group of the formula

—$CH_2COO$—$R_7$—O—$COCH_2$— wherein $R_7$ represents an alkylene group or xylylene group, or a group of the formula —$CH_2CH_2$—O CO—$R_8)_m$ CO O—$CH_2CH_2$— wherein m represents 0 or 1, $R_8$ represents an alkylene group (the alkylene chain may optionally be interrupted by a sulfur atom), an alkenylene group, phenylene group or 1,4-cyclohexylene group.

$R_a$ and $R_b$ represent methyl group or $R_a$ and $R_b$ together with carbon atom to which they are attached, form cyclohexyl group.

$R_c$ represents methyl group.

$R_d$ represents an alkyl group having one to five carbon atoms.

$R_c$ and $R_d$ together with carbon atom to which they are attached, may form cyclopentyl group, cyclohexyl group, a group of the formula:

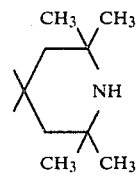

a group of the formula

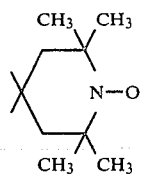

Murayama U.S. Pat. No. 3,975,462, patented Aug. 17, 1976 provides piperidine-spiro-hydantoin derivatives having the formula:

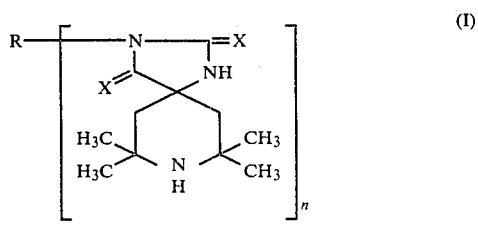
(I)

In the above formula (I), X represents oxygen atom or sulfur atom: n is an integer of 1 to 4 inclusive; and R represents when n is 1, an alkenyl group which may be substituted with halogen, an alkynyl group which may be substituted with phenyl, an aralkyl group which may be substituted with halogen, alkyl of one to four carbon atoms or halomethyl, a hydroxyalkyl group, an alkoxyalkyl group, an alkenyloxyalkyl group, an aryloxyalkyl group, an alkylthioalkyl group, an acyloxyalkyl group, an epoxyalkyl group, an N- alkyl-substituted aminoalkyl group, an alkoxycarbonyl alkyl group, an aryloxycarbonylalkyl group, an aliphatic acyl group, an alkoxycarbonyl group, a phosphino group which is substituted with phenoxy or alkoxy or a phosphinyl group which is substituted with phenoxy or alkoxy, when n is 2, an alkenylene group of four to eighteen carbon atoms, a dialkylene ether group, an aralkylene group, a bis-(acyloxyalkylene) group, or an alkylene-bis-(oxycarbonylalkyl) group, when n is 3, a tris-(acyloxyalkylene) group, an alkane-tris-(oxycarbonylalkyl) group or a group of the formula:

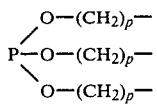

in which p is an integer of 1 to 8 inclusive and p's may be the same or different, and, when n is 4, a tetrakis (acyloxyalkylene) group.

Avar et al U.S. Pat. No. 3,976,658, patented Aug. 24, 1976 provides pyrazole derivatives of the formula:

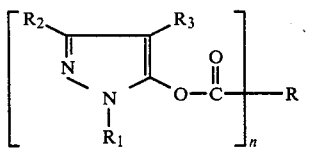

in which $R_1$ is a $C_{1-22}$ alkyl radical, a $C_{5-32}$ cycloalkyl radical, a $C_{6-12}$ cycloalkylalkyl radical, a $C_{7-12}$ aralkyl radical, of which the alkyl radical and the alkyl moiety of the cycloalkyl-alkyl radical are uninterrupted or interrupted by one or two sulphur atoms or by —COO—, and the aryl nucleus of the aralkyl radical is unsubstituted or substituted by a hydroxyl group and/or 1 or 2 $C_{1-12}$ alkyl radicals, or a phenyl group, unsubstituted or substituted by one or more substituents selected from one or two halogen atoms, a cyano group, a hydroxyl group, 1 or 2 $C_{1-12}$ alkyl radicals, 1 or 2 $C_{1-12}$ alkoxy radicals, a phenyl group and the radicals $R_4$—O— and $R_4$—$SO_2$—, wherein $R_4$ is a phenyl group, unsubstituted or substituted by 1 or 2 $C_{1-8}$ alkyl radicals, $R_2$, independently of $R_1$, has one of the significances of $R_1$, or is a cyano group or the radical —$COOR_5$, wherein $R_5$ is a $C_{1-12}$ alkyl radical, a $C_{5-12}$ cycloalkyl radical, a $C_{6-12}$ cycloalkyl-alkyl radical or a phenyl group, unsubstituted or substituted by a hydroxyl group and/or 1 or 2 $C_{1-8}$ alkyl radicals, $R_3$ is a hydroge atom or one of the significances of $R_1$, —$COR_1$ or —$COOR_5$, n is 1, 2 or 3, and R, when n is 1, is a phenyl group, unsubstituted or substituted by a total of up to 3 substituents selected from 1 hydroxyl group, one to three halogen atoms, 1 phenyl group, 1 benzyl group, 1 phenoxy group, 1 to 3 alkyl radicals each containing one to eight carbon atoms and the sum of the carbon atoms not exceeding twelve, and 1 to 3 alkoxy radicals each containing one to twenty-two carbon atoms and the sum of the carbon atoms not exceeding twenty-two, or a monovalent naphthalene radical, or a monovalent radical of thiophene, benzothiophene, dibenzothiophene, furan, benzofuran, or dibenzofuran, and when n is 2, is a phenylene group, unsubstituted or substituted by a $C_{1-4}$ alkyl radical and/or a halogen atom, or a divalent naphthalene radical, or a divalent radical of thiophene or dibenzofuran, and when n is 3, is a 1,3,5-trivalent benzene radical.

In accordance with the instant invention, stabilizers for organic polymeric materials are provided, comprising a β-thioalkyl propionic acid ester of a polyhydric alcohol, a phenolic antioxidant, and a 2,2,6,6-tetramethyl-4-piperidyl carboxylic acid ester having the general formula:

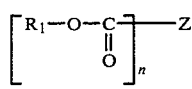

wherein:

$R_1$ is selected from the group consisting of

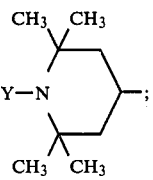

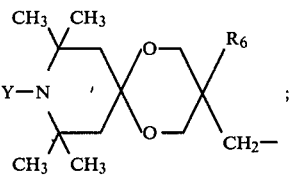

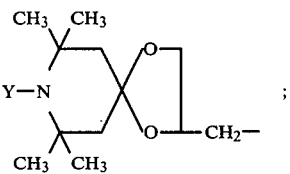

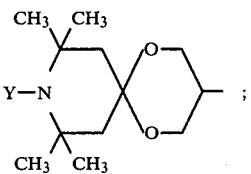

Y is selected from the group consisting of hydrogen and O;

$R_6$ is lower alkyl having from one to two carbon atoms;

n is selected from the group consisting of 1, 2, 3 and 4; and

Z is an organic radical having a valence from 1 to 4, the valence positions being taken by

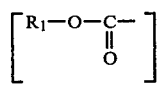

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, and amino- and hydroxy-substituted such radicals.

The $R_6$ alkyl have from one to two carbon atoms, and the Z alkyl and alkenyl have from one to about twenty carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexadecyl, octadecyl, and eicosyl; allyl, butenyl, oleyl, ricinoleyl and linoleyl.

The Z alkylene, alkenylene and alkylidene have from one to twenty carbon atoms, and include saturated and unsaturated methylene, ethylene, propylene, butylene, amylene, hexylene, heptylene, octylene, nonylene, decylene, dodecylene, and octadecylene; vinylene, ethylidene, propylidene, butylidene, hexylidene and octylidene.

The Z aryl and arylene have from six to about twenty carbon atoms and include phenyl, naphthyl and phenanthryl; phenylene, naphthylene and phenanthrylene.

The Z aralkyl and aralkylidene have from seven to about twenty carbon atoms, and include phenmethyl, phenethyl, phenpropyl, phenbutyl and naphthethyl.

The Z heterocyclic alkyl, heterocycloalkylene and heterocycloalkylidene have heterocyclic rings with from three to six ring atoms of which from one to three are selected from nitrogen, sulfur and oxygen, and the remainder, if any, are carbon, with one or more alkyl, alkylene or alkylidene substituents, and include piperidine, piperazine, pyrrole, pyrazoline, pyrrollidine, melamine, isocyanuric acid, triazine, pyrazine, pyridone, pyridazine, hexahydropipyrazine, pyrimidine, and hexahydropyrimidine.

The Z cycloalkyl, cycloalkenyl, cycloalkenyl, cycloalkylene, cycloalkenylene and cycloalkylidene, cycloalkalkyl and alkcycloalkyl have from three to twenty carbon atoms and include a cycloaliphatic ring of from three to eight carbon atoms in a monocyclic or bicyclic structure, optionally with an alkyl or alkylene substituent, and include cyclopropyl, cyclobutyl, cyclopentyl, cyclohexyl, cycloheptyl, cyclooctyl, bicyclic cycloheptyl, bicyclic cyclooctyl, methyl cyclopentyl, methyl cyclohexyl, cyclohexylidene, cyclopentylidene, cyclohexylene and cycloheptylene.

Amino-substituted Z radicals include nitrilo trimethylene, ethylene diamine tetramethylene, and nitrilo dimethylene ethylene.

It will be apparent that the Z radical is the residue of a mono or polycarboxylic acid all of whose carboxylic acid groups are esterified by $R_1$ groups, wich can be the same or different. The following compounds are exemplary:

1. 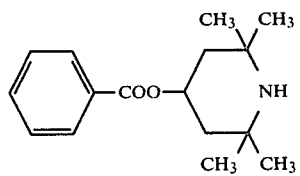

2. 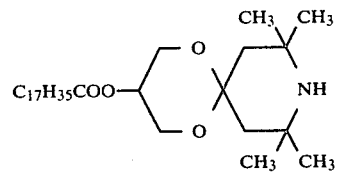

3. 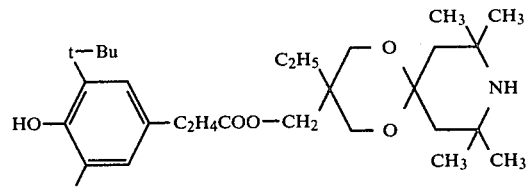

4. 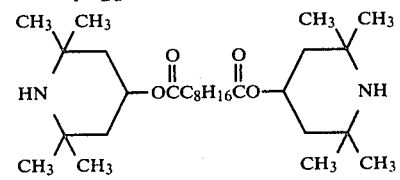

5. 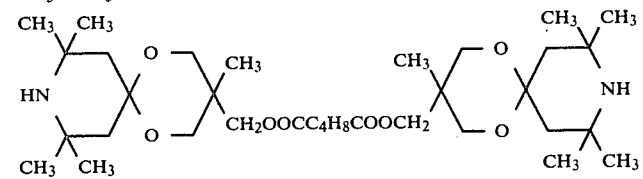

6. 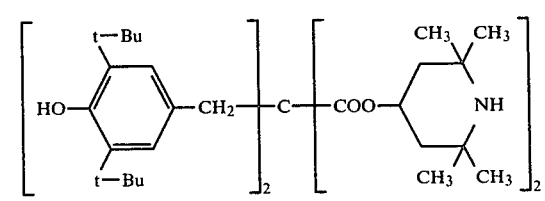

-continued
7. 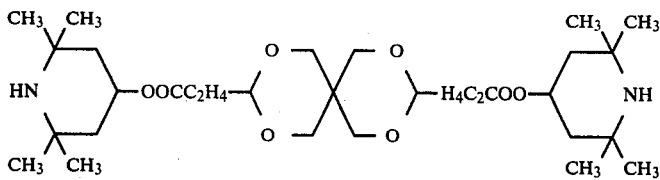
8. 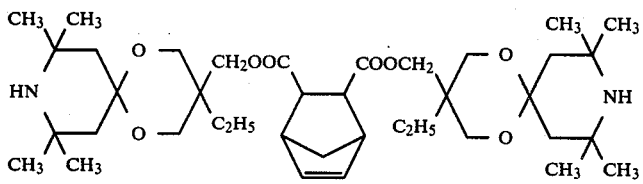
9. 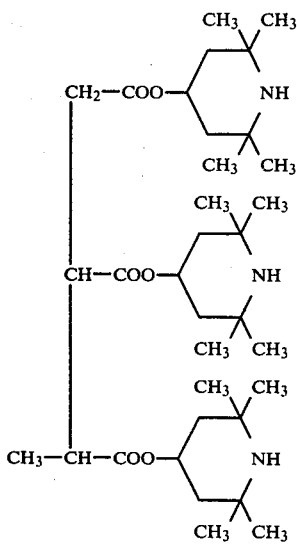
10. 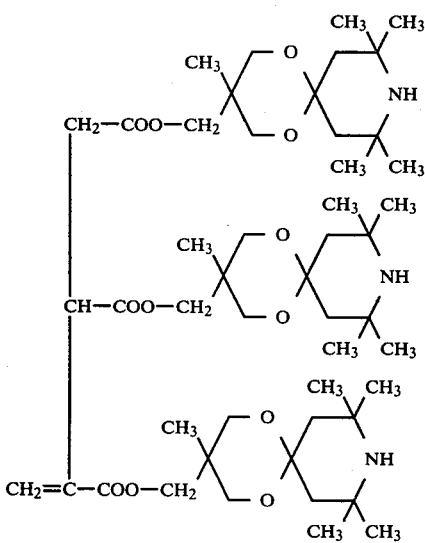
11. 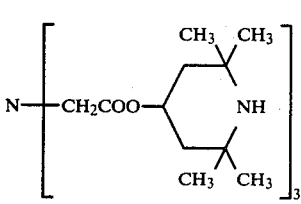

-continued
12. 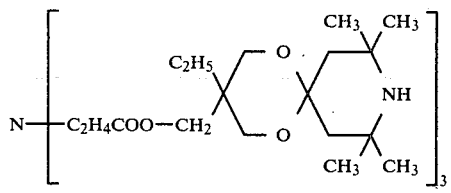
13. 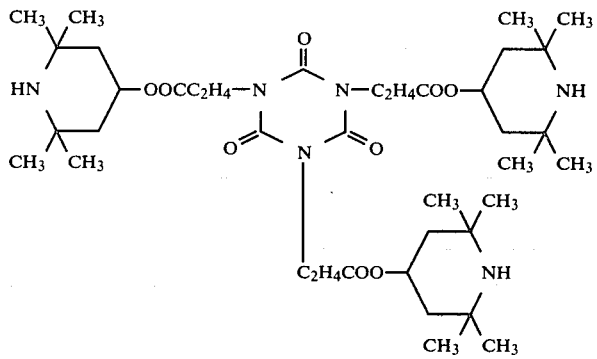
14. 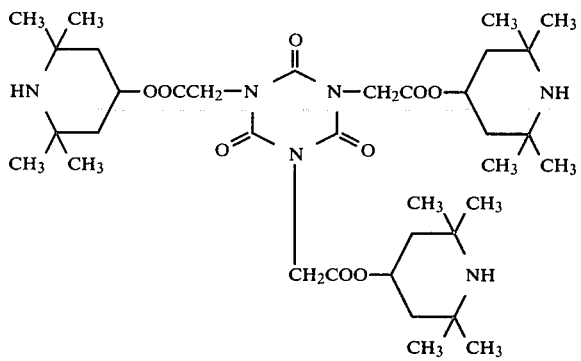
15. 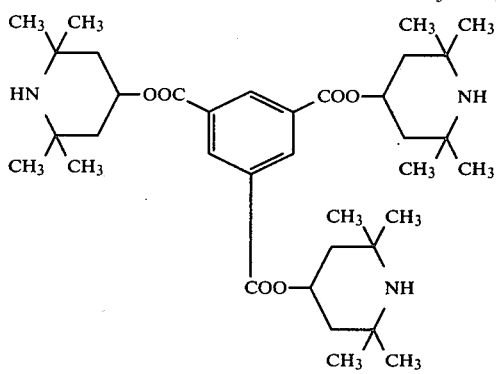
16. 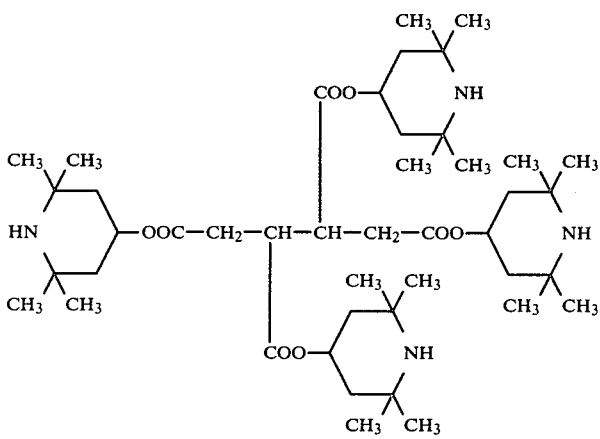

-continued
17. 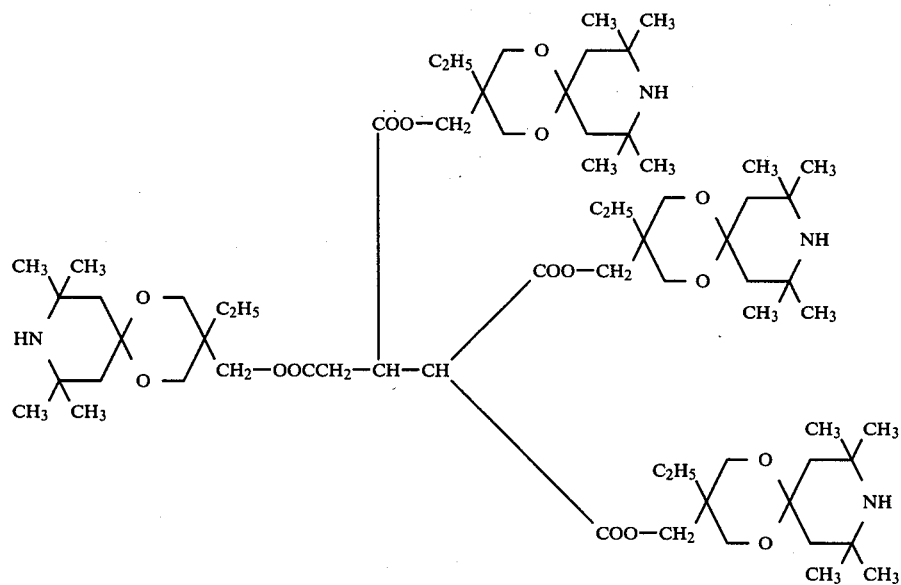
18. 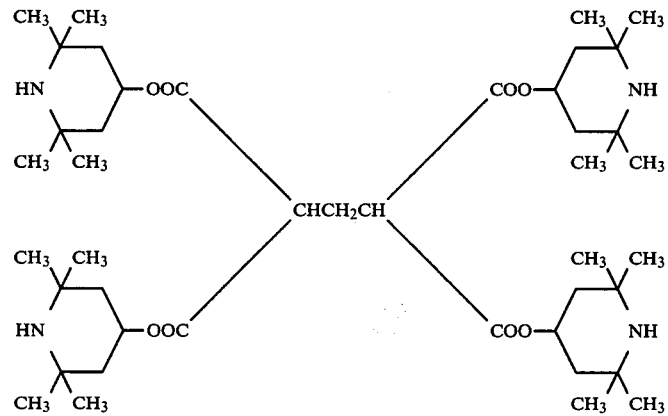
19. 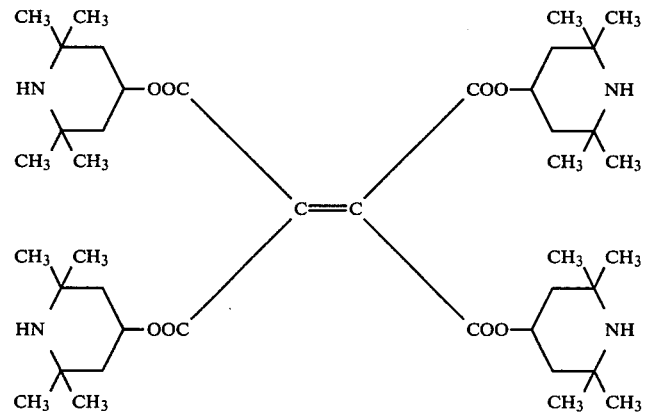

-continued
20. 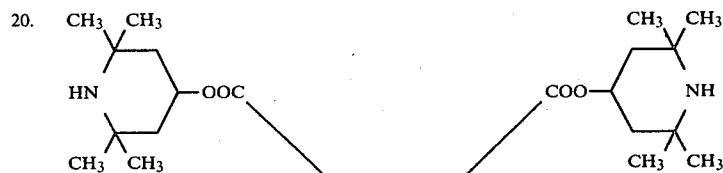
21. 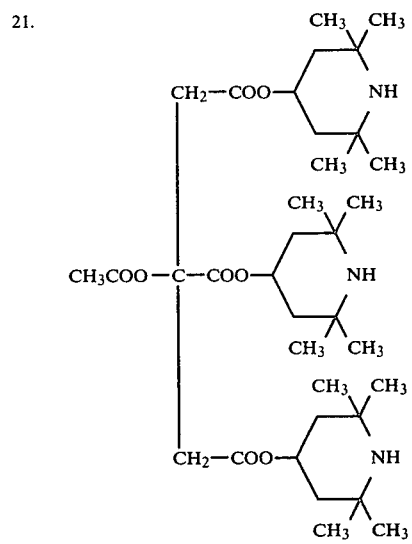
22. 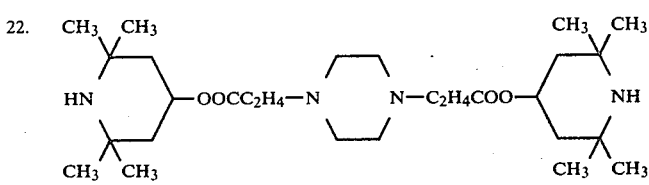
23. 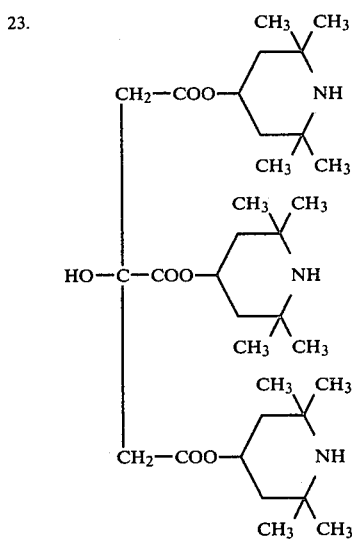

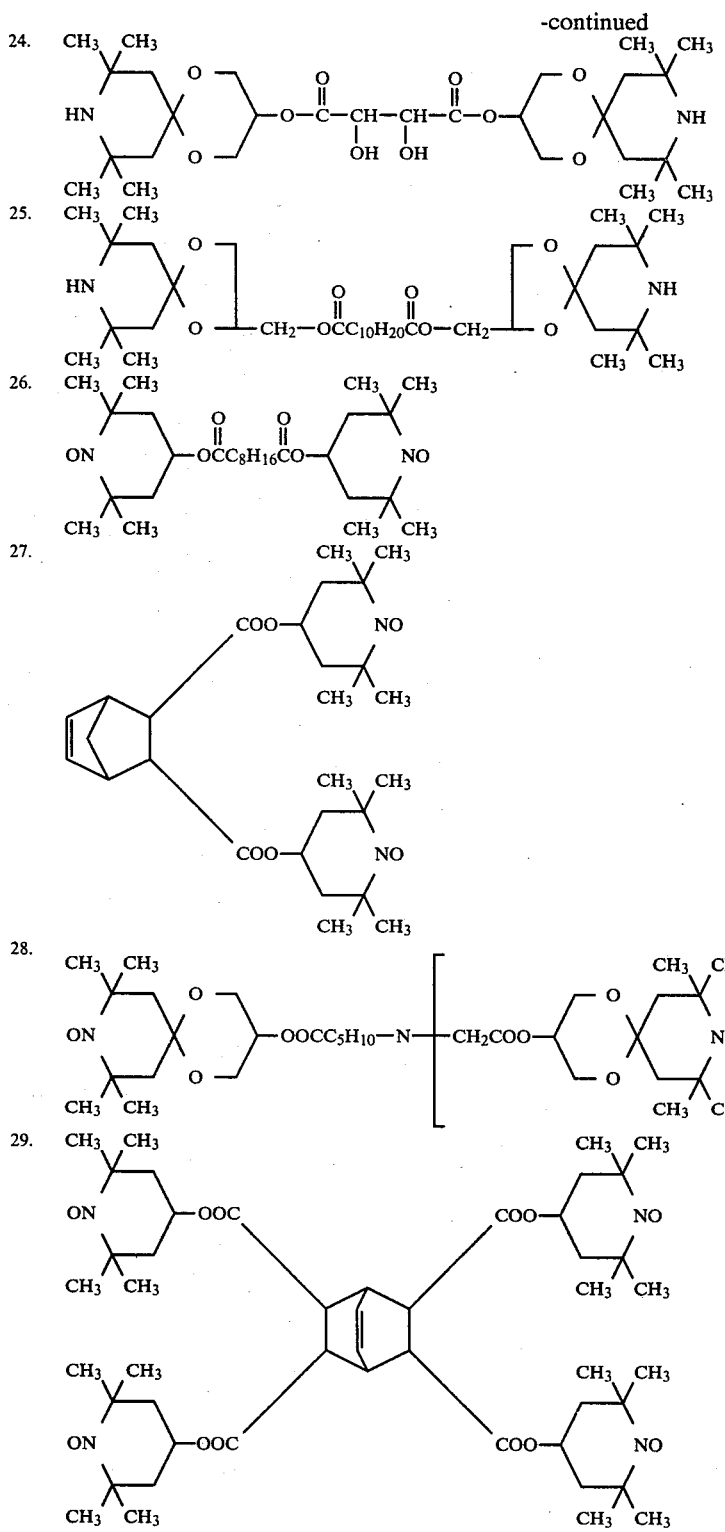

The 2,2,6,6-tetramethyl-4-piperidyl carboxylic acid esters are for the most part known compounds. All are readily prepared using conventional procedures. The starting materials are either available or readily synthesized without difficulty. The corresponding 2,2,6,6-tetramethyl-4-hydroxy piperidine is used as a starting material for the 2,2,6,6-tetramethyl-4-piperidyl group $R_1$. This is reacted in the presence of an organic solvent and an alkali metal alkoxide with one or more free carboxylic acid groups of the corresponding mono or polycarboxylic acid with a Z nucleus containing one or more unesterified carboxylic acid groups. The hydroxy group of the piperidine becomes esterified with the free carboxylic acid groups, forming the 4-piperidinyl carboxylic acid ester of the invention:

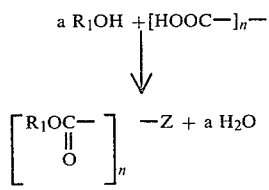

$$a\ R_1OH + [HOOC-]_n-Z$$
$$\downarrow$$
$$\left[ \begin{array}{c} R_1OC- \\ \parallel \\ O \end{array} \right]_n -Z + a\ H_2O$$

Acids which can be used include acetic, propionic, butyric, valeric, capric, caproic, lauric, myristic, palmitic, and stearic; succinic, glutaric, malic, lactic, adipic, suberic, azelaic, pimelic, citric, trimellitic, pyromellitic, butane-1,2,3,4-tetracarboxylic acid, and cyclopentane tetracarboxylic acid, nitrilotriacetic, ethylene diamine tetraacetic, benzoic, terephthalic, and phthalic.

The stabilizer mixtures of the invention in addition to the 2,2,6,6-tetramethyl-4-piperidyl carboxylic acid ester include a β-thioalkyl propionic acid ester and a phenolic antioxidant. Such combinations are complementary, and impart an enhanced resistance of the polymer to deterioration when exposed to light and/or heat. Such stabilizing effectiveness is enhanced as compared to only one or two components of the three-component stabilizer mixtures of the invention.

The β-thioalkyl propionic acid esters of the invention have the formula:

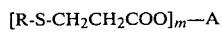

[R-S-CH$_2$CH$_2$COO]$_m$—A wherein:

m is a number from three to six;

R is a long chain alkyl group having from about four to about thirty carbon atoms; and A is the residue of a polyhydric alcohol having from three to six hydroxyl groups esterified with R—S—CH$_2$CH$_2$CO—groups and from three to about thirty carbon atoms.

The R alkyl can be methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexadecyl, octadecyl, eicosyl; allyl and behenyl.

The A polyol residue can be alkylene, such as propylene, butylene, amylene, hexylene, heptylene, octylene, nonylene, decylene, dodecylene, and octadecylene; arylene, such as phenylene and naphthylene and phenanthrylene; heterocyclic alkylene and heterocyclic alkylidene, which have heterocyclic rings with from three to six ring atoms of which from one to three are selected from nitrogen, sulfur and oxygen, and the remainder, if any, are carbon, with one or more alkyl, alkylene or alkylidene substituents, and include piperidine, piperazine, pyrrole, pyrazoline, pyrrollidine, melamine, isocyanuric acid, triazine, pyrazine, pyridone, pyridazine, hexahydropipyrazine, pyrimidine, and hexahydropyrimidine; cycloalkylene and cycloalkylidene, which include a cycloaliphatic ring of from three to eight carbon atoms in a monocyclic or bicyclic structure, optionally with an alkyl or alkylene substituent, and include cyclopropylene, cyclobutylene, cyclopentylene, cyclohexylene, cycloheptylene, cylooctylene, bicyclic cycloheptylene, bicyclic cyclooctylene, methyl cyclopentylene, methyl cyclohexylene, cyclohexylidene, cyclopentylidene, and cycloheptylidene.

Exemplary β-thioalkyl propionic acid esters include:

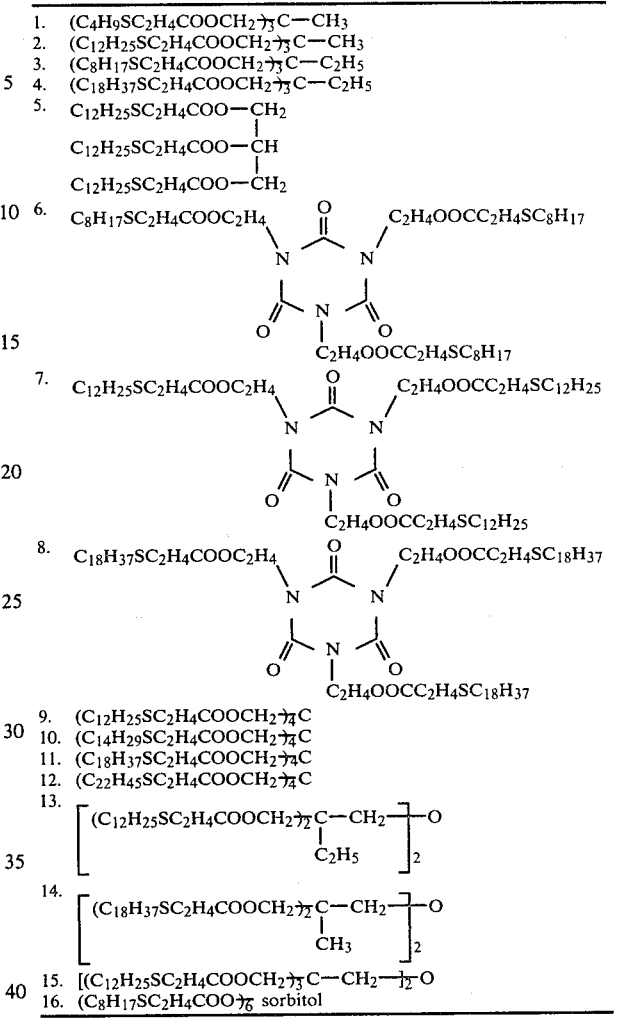

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

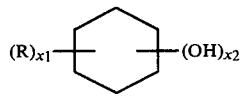

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

where R' is aryl, alkyl or cycloalkyl, or thiohydrocarbon groups having from one to about thirty carbon atoms, and carboxyl

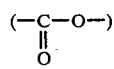

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

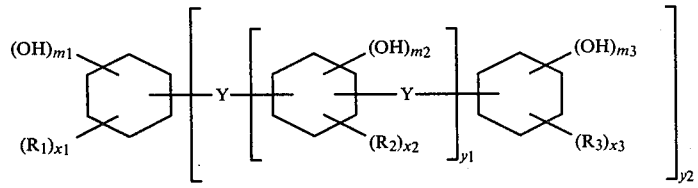

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

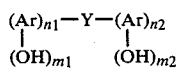

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking groups can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to subgenera as follows:

(1) Y groups where at least one carbon in a chain or cyclic arrangement connect the aromatic groups, such as:

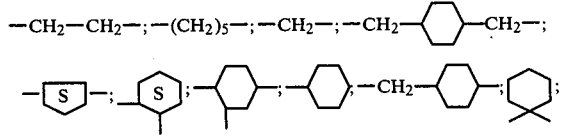

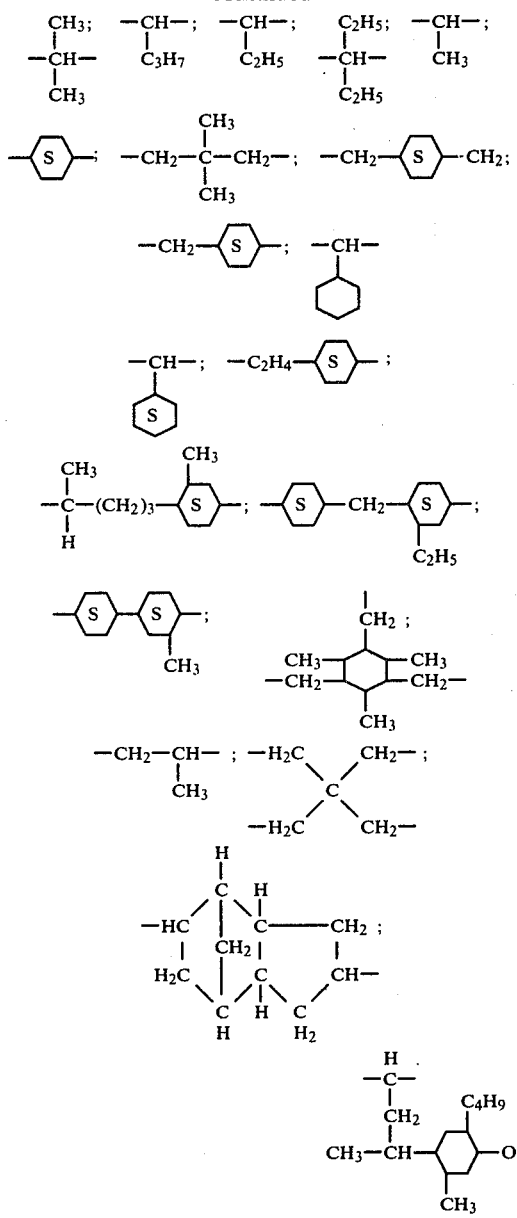

(2) Y groups where only atoms other than carbon link the aromatic rings, such as

—O—, —S—,

—S—, —S(=O)(=O)—

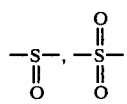

and —(S)$_x$— where x is a number from one to ten;

(3) Y groups made up of more than a single atom including both carbon and other atoms linking the aromatic nuclei, such as:

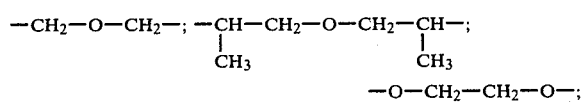

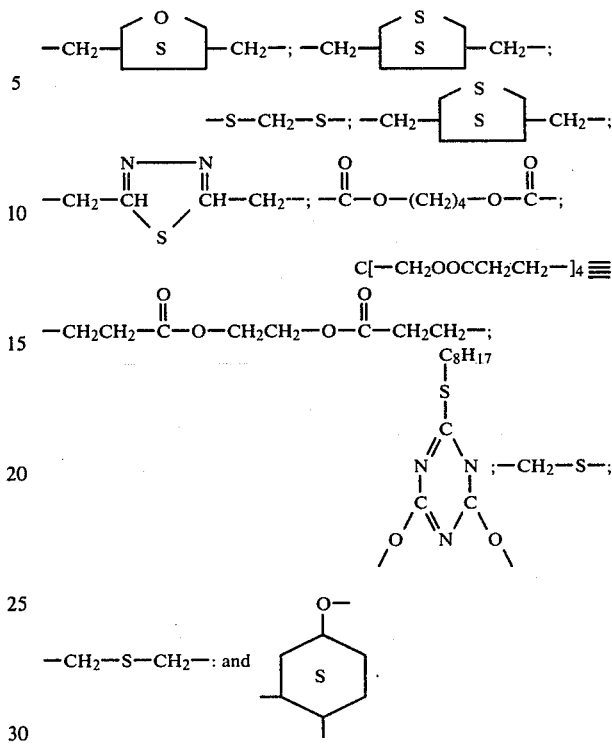

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol,2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o- , m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxycinnamate, 4-benzyloxy-phenol, p-acetylaminophenol, p-stearyl-aminophenol methyl-p-hydroxybenzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl(4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-ditertiary-butyl-phenol), 2,2-bis-(4-hydroxy phenyl)-propane, methylene-bis(p-cresol, 4,4'-benzylidene bis-(2-tertiary-butyl-5-methyl-phenol), 4,4'-cyclohexylidene bis-(2-tertiary-butylphenol),2,2'-methyl-bis-(4-methyl-6-(1'-methylcyclohexyl)-phenol),2,6-bis-(2'-hydroxy-3'-tertiary-butyl-5'-methylbenzyl)-4-methylphenol,4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis (3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butylphenol), 4,4'-n-butylidene-(2-t-butyl-5-methyl-phenol) 2,2'-methylene-bis-(4-methyl-6-(1'-methyl-cyclohexyl)phenol), 4,4'cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl) propane, 2,2'-methylene-bis-(4-methyl-5-isopropylphenol), 2,2'methylene bis-(5-tert-butyl-4-chlorophenol), (3,5-di-tert-butyl-4-hydroxyphenyl)-(4'-hydroxyphenyl)ethane, (2-hydroxy-phenyl)-(3',5'-di-tert-butyl-4',4-hydroxyphenyl)ethane, 2,2'-methylene bis-(4-octylphenol), 4,4'-propylene bis-(2-tert-butylphenol), 2,2'-isobutylene bis-(4-nonylphenol), 2,4-bis-(4-hydroxy-3-t-butylphenoxy)-6-(n-octylthio)-1,3,5-triazine, 2,4,6-tris-(4-hydroxy-3-t-butylphenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)thiazole, 4,4'-bis-(4-hydroxyphenyl)pentanoic acid octadecyl ester, cyclopentylene-4,4'-bis-phenol,2-ethylbutylene-4,4'-bisphenol, 4,4'-cyclooctylenebis-(2-cyclohexylphenol), β,β-thiodiethanol bis-(3-tert-butyl-4-hydroxyphenoxy acetate), 1,4-butanedio bis-(3-tert-butyl-4-hydroxyphenoxy acetate), pentaerythritoltetra (4-hydroxyphenol propionate), 2,4,4'-tri-hydroxy benzophenon, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methyl-phenyl sulfoxide), bis-(3-ethyl-5-tert-butyl-4-hydroxy benzyl)sulfide, bis-(2-hydroxy-4-methyl-6-tert-butyl phenyl)sulfide, 4,4'-bis-(4-hydroxyphenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methylbenzoyl-n-octane, 2,2'-ethylene -bis[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4methoxy-6-tert-butyl phenol)-bis-[3,3-bis-(4-hydroxy-3-t-butylphenyl)butyric acid] glycol ester, 4,4'-butylidene bis-(6-t-butyl-m-cresol), 1,1,3-tris-(2-methyl-4-hydroxy-5-t-butylphenyl) butane, 1,3,5-tris-(3,5-di-t-butyl-4-hydroxybenzyl)-2,4,6-trimethylbenzene, tetrakis [methylene-3(3,5-di-t-butyl-4-hydroxyphenyl)propionate] methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'thiobis (6-t-butyl-m-cresol) and pentaerythritol hydroxyphenyl propionate.

A particularly desirable class of polyhydric polycyclic phenols are the dicyclopentadiene polyphenols, which are of the type:

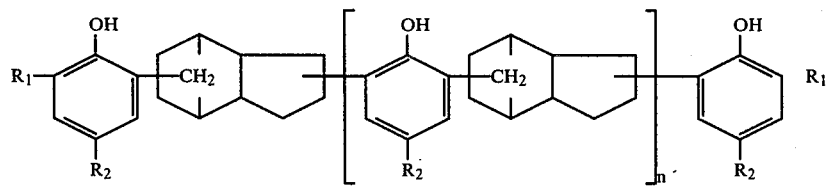

in which

R₁ and R₂ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

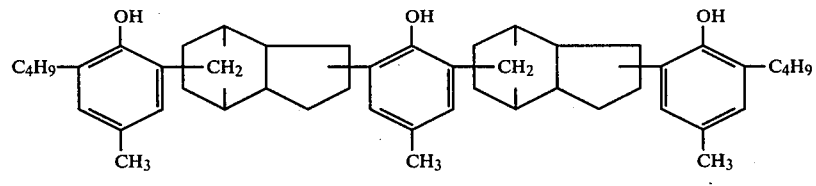

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British Pat. No. 961,504.

In addition to these three ingredients, which are the essential ingredients, the stabilizer compositions of the invention can include other stabilizers conventionally used as heat and/or light stabilizers for synthetic resins, including thiodipropionic acid esters, polyvalent metal salts of organic acids, organic triphosphites and acid phosphites.

The thiodipropionic acid ester has the following formula:

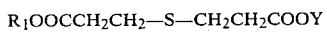

in which $R_1$ is an organic radical selected from the group consiting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

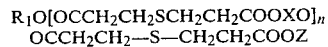

wherein

Z is hydrogen, $R_2$ or M;

n is the number of thiodipropionic acid ester units in the chain; and

X is a bivalent hydrocarbon group of the type of $R_1$; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodpropionic acid ester species coming within the above-mentioned categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX—O]_n OCCH_2CH_2SCH_2CH_2COOZ$
(d) $[R_1OOCCH_2CH_2SCH_2CH_2COO]_2M$

In the above formulae, $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures as condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene

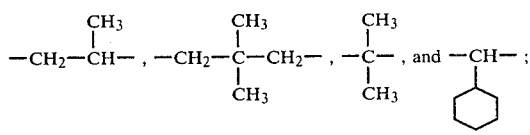

arylene radicals such as phenylene

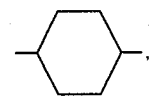

methylenephenylene

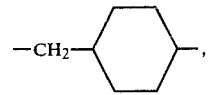

dimethylene phenylene,

and alicyclene radicals, such as cyclohexylene

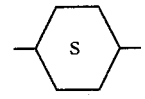

and cyclopentylene

As exemplary of the thiodipropionic acid esters which can be used, there can be mentioned the following: monolauryl thiodipropionic acid, dilauryl thiodipropionate, butyl stearyl thiodipropionate, di-(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

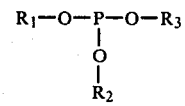

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

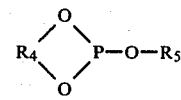

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

$R_5$ is hydrogen or a cation, in the case of the acid phosphites.

Also useful organic triphosphites are mixed heterocyclic-open chain phosphites of the type:

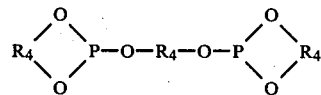

More complex triphosphites are formed from trivalent organic radicals, of the type:

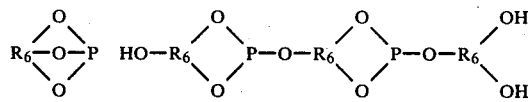

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

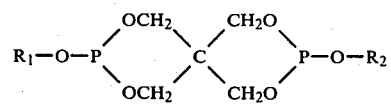

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

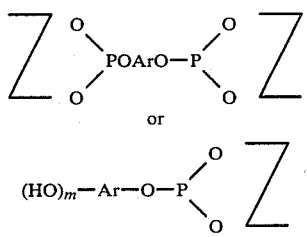

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octylphenyl) phosphite, di(2-ethylhexyl) (isooctylphenyl)phosphite, tri(2-cyclohexylphenyl)phosphite, tri-α-naphthyl phosphite, tri(-phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10 tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-diethoxyethoxyethyloxy)-2,4,8,10-tetraoxa-3,9-diphosphaspiro-(5,5)-undecane; 3,9-di(methoxy(polyethoxy)ethyloxy)-2,4,8,10tetraoxa-3,9-diphosphaspiro (5,5)-undecane (where the (polyethoxy) ethyloxy group has an average molecular weight of 350)3,9-di(methoxy (polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary butyl-5-methyl-phenol))isooctyl phosphite, mono(4,4'-thio-bis(2-tertiary-butyl-5-methyl-phenol)) di-phenyl phosphite, tri-(4,4'-n-butylidenebis(2-tertiary-butyl-5-methyl-phenol))-phosphite, (4,4'-benzylidene-bis(2-tertiary-butyl-5-methyl-phenol))diphenyl phosphite, isooctyl 2,2'-bis(-parahydroxyphenyl)propane phosphite, decyl 4,4'-n-butylidene-bis(2-tertiary-butyl-5-methylphenol)phosphite,tri-4,4'-thiobis(2-tertiary-butyl-5-methylphenol)-phosphite, 2-ethylhexyl-2,2'-methylene-bis(4-methyl-6,1'-methylcyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl-(2,6-bis(2'-hydroxy-3,5-dinonylbenzyl)-4-nonyl phenyl))phosphite, tetra-tridecyl 4,4'-n-butylidene-bis(2-tertiary butyl-5-methyl phenyl)diphosphite, tetra-isooctyl 4,4'-thiobis(2-tertiary butyl-5-methyl phenyl)diphosphite, 2,2'-methylene-bis(4-methyl 6,1'-methyl cyclohexyl phenyl)polyphosphite, isooctyl-4,4'-isopropylidene-bis-phenyl-polyphosphite, 2-ethylhexyl-2,2'-methylene-bis(4-methyl-6,1'-methyl-cyclohexyl)-phenyl triphosphite, tetra-tridecyl-4,4'-oxydiphenyl diphosphite, tetra-n-dodecyl-4,4'-n-butylidene bis(2-tertiary-butyl-5-methylphenyl)diphoshite, tetratridecyl-4,4'-iso-propylidene bisphenyl diphosphite, hexa-tridecyl butane-1,1,3-tris(2'-methyl-5'-tertiary-butylphenyl-4'-)triphosphite.

Exemplary acid phosphites are di(phenyl) phosphite, monophenyl phosphite, mono-(diphenyl)phosphite, dicresyl phosphite, di-(o-isooctylphenyl)phosphite, di(p-ethylhexylphenyl)phosphite, di(p-t-octylphenyl)-phosphite, di(dimethylphenyl)phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methyl-phenol))-phosphite, (4,4'-thio-bis(2-tertiary-butyl-5-methyl-phenol))phenyl phosphite, bis(4,4'-n-butylidene-bis(2-tertiary-butyl-5-methyl-phenol))phosphite, mono(4,4'-benzylidene-bis(2-tertiary-butyl-5-methyl-phenol))-phosphite, mono(2,2'-bis-(-parahydroxyphenyl)-propane)phosphite, mono(4,4'-n-butylidene-bis(-2-tertiary-butyl-5-methyl-phenol)phosphite, bis(4,4'-thiobis(2-tertiary-butyl-5-methylphenol))phosphite, mono-2-ethylhexyl-mono-2,2'methylene-bis(4-methyl-6,1'me-thylcyclohexyl)phenol phosphite, bis(2,2'-bis-(para-hydroxyphenyl)propane)phosphite, monoisooctyl mono(4,4'thio-bis(2-tertiary-butyl-5-methyl-phenol))-phosphite, isooctyl-(2,6-bis(2'-hydroxy-3,5-dinonylben-zyl)-4-nonyl phenyl))phosphite, tri-tridecyl 4,4'-n-butylidene-bis(2-tertiary-butyl-5-methyl phenyl)di-phosphite, triisoctyl 4,4'-thiobis(2-tertiary-butyl-5-methyl phenyl)diphosphite, bis(2,2'-methylene-bis (4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butyli-dene bis(2-tertiary-butyl-5-methylphenyl)diphosphite, di-tridecyl-4,4'-isopropylidene bisphenyl diphosphite, tetra-tridecyl butane-1,1,3-tris(2'-methyl-5'-tertiary-butylphenyl-4-)triphosphite.

The 2,2,6,6-tetrasubstituted-4-piperidyl carboxylic acid ester-triphosphite-acid phosphite-containing stabilizer compositions of the invention are effective stabilizers to enhance the resistance to deterioration due to heat and/or light of synthetic polymeric materials which are susceptible to such degradation.

The stabilizer systems of the invention are especially effective stabilizers for olefin polymers such as polyethylene, polypropylene, polybutylene, polypentylene, polyisopentylene, and higher polyolefins.

Olefin polymers on heating and working in air undergo degradation, resulting in a loss of melt viscosity.

The stabilizer systems can be employed with any olefin polymer, including low-density polyethylene, high-density polyethylene, polyethylenes prepared by the Ziegler-Natta process, polypropylenes prepared by the Ziegler-Natta process, and by other polymerization methods from propylene, poly (butene-1), poly (pentene-1), poly (3-methylbutene-1) poly (4-methylpen-tene-1, polystryene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the stabilizer system of the invention. The term "olefin polymer" encompasses both homopolymers and copolymers.

Polypropylene solid polymer can be defined in a manner to differentiate it from other polyolefins as having a density within the range from 0.86 to 0.91, and a melting point above 150° C. The stabilizer system of the invention is applicable to all such polypropylenes as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade name PRO-FAX, and having a softening or hot-working temperature of about 350° F., is an example of a sterically regular polypropylene polymer.

Mixtures of polypropylene with other compatible polymers and copolymers of propylene with copolymerizable monomers not reactive with the polypropylene stabilizer combination can also be stabilized, for example, mixtures of polyethylene and polypropylene, and copolymers of propylene and ethylene which have a sufficient amount of propylene to present the instability problem that is resolved by the stabilizer combinations of the invention.

The stabilizer combinations are also effective to enhance the resistance to light and/or heat degradation of polystyrene; polydienes, such as polybutadiene and polyisoprene; and copolymers of olefins and dienes with other ethylenically and acetylenically unsaturated monomers, such as ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsilon-caprolactam; polyhexamethylene adipamide and polydecamethylene adipamide; polyurethanes; and epoxy resins.

The synthetic polymer can be in any physical form, including (for example) filaments, yarns, films sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.001 to about 15% total stabilizers by weight of the polymer are satisfactory. Preferably, from 0.05 to 5% is employed, for optimum stabilization.

Inasmuch as all components are solids, the stabilizer system of the invention are readily rendered in solid particulate form, comprising a blend of (a) a 2,3,6,6-tetramethyl-4-piperidyl carboxylic acid ester in an amount from about 90 to about 35 parts by weight;

(b) a phenol in an amount of from about 10 to about 35 parts by weight; and (c) a β-thioalkyl propionic acid ester in an amount of from about 10 to about 35 parts by weight.

The stabilizer compositions of the invention can be employed as the sole stabilizer or in combination with other conventional heat and light stabilizers for the particular synthetic polymer.

Thus, for example, in the case of polyvinyl chloride resins, otherpolyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flameproofing agents, pigments and fillers, can be employed.

Preferably, the stabilizer system is added to the synthetic polymer in an amount to provide in the polymer from about 0.01 to about 5% of the 2,2,6,6-tetramethyl-4-piperidyl carboxylic acid ester, from about 0.001 to about 5% of the phenol, and from about 0.001 to about 5% of the β-thioalkyl propionic acid ester. More than 5% of the phenol and more than 15% of the total stabilizers may evidence a lessened stabilizing effect or even a depressing effect on stabilization at high temperatures above 275° C.

The stabilizer combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extrusion or injection molding or fiber-forming. In such operations, it will be found to have a considerably improved resistance to reduction melt viscosity during the heating, as well as a better resistance to discoloration and embrittlement on ageing and heating.

The following Examles illustrate preferred stabilizer systems of the invention:

EXAMPLES 1 to 8

A group of polyvinyl chloride resin compositions was prepared having the following formulation:

| Ingredient | Parts by Weight |
| --- | --- |
| Polyvinyl chloride | 100 |
| Dioctylphthalate | 48 |
| Epoxidized soyabean oil | 2 |
| Tris- nonylphenyl phosphite | 0.2 |
| Ca stearate | 1 |
| Piperidyl ester as shown in Table I | 0.2 |
| 2,6-di-tert-butyl-p-cresol | 0.1 |
| β-thioalkyl propionic acid ester as shown in Table I | 0.1 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light (denoted as Hours to Failure in Table I).

Heat stability was evaluated in a Geer forced air oven at 175° C., and the time to failure in minutes noted (denoted as Minutes to Failure in Table I).

This test was carried out for the stabilizer compositions in accordance with the invention in which the stabilizers had the formulae indicated in Table I. The following results were obtained:

TABLE I
| Example No. | Piperidyl Ester | β-Thioalkyl Propionic Acid Ester | Hours to Failure |
|---|---|---|---|
| Control 1 | 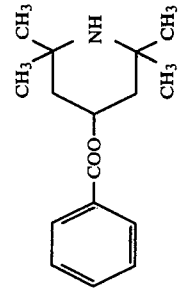 | Dilauryl thiodipropionate | 385 |
| Control 2 | 2-hydroxy-4-methoxy-benzophenone | 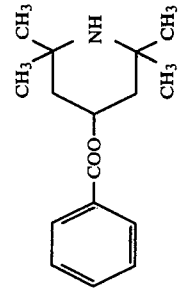 | 360 |
| 1 | 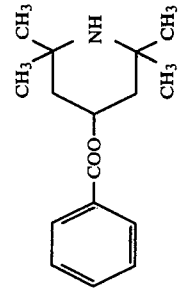 | $(C_{18}H_{37}SC_2H_4COOCH_2)_3$—C—$C_2H_5$ | 515 |
| 2 | 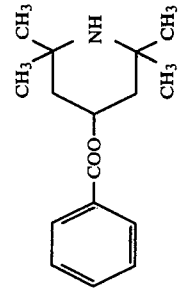 | $(C_{12}H_{25}SC_2H_4COOCH_2)_4$—C | 560 |

TABLE I-continued
| Example No. | Piperidyl Ester | β-Thioalkyl Propionic Acid Ester | Hours to Failure |
|---|---|---|---|
| 3 | 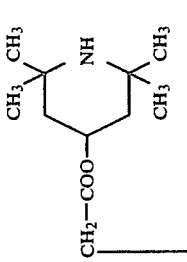 | 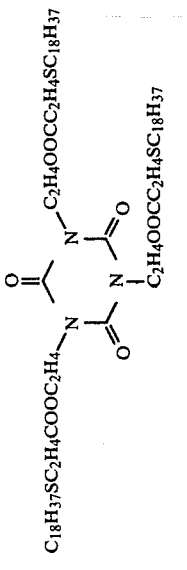 | 575 |
| 4 | 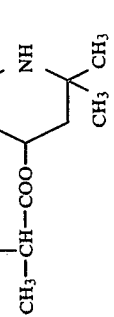 | $[(C_{12}H_{25}SC_2H_4COOCH_2)_3C-CH_2-O]_2$ ... $C_2H_5$ | 605 |

TABLE I-continued
| Example No. | Piperidyl Ester | β-Thioalkyl Propionic Acid Ester | Hours to Failure |
|---|---|---|---|
| 5 | | | 570 |
| 6 | | | 550 |
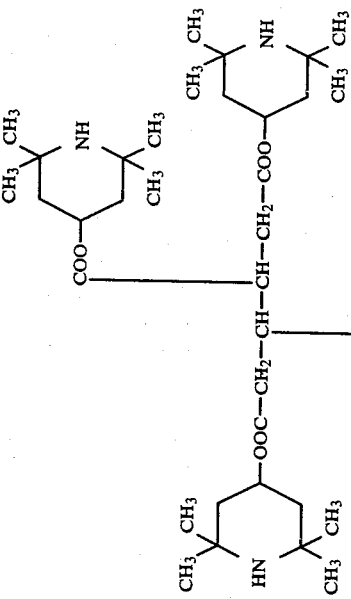

It is apparent that the stabilizer compositions in accordance with the invention are far superior to the controls containing only one of the components of the three-component stabilizer of the invention.

EXAMPLES 9 to 12

Polypropylene compositions were prepared using stabilizer compositions of the invention and having the following formulation:

| Ingredient | Parts by Weight |
| --- | --- |
| Polypropylene | 100 |
| Piperidyl ester as shown in Table II | 0.3 |
| β-Thioalkyl propionic acid ester as shown in Table II | 0.3 |
| Phenol as shown in Table II | 0.1 |

The composition was thoroughly blended in a Brabender Plastograph, and then compression-molded at 180° C. under 200 kg/cm² pressure for five minutes to form sheets 1.0 mm thick.

Pieces 2.5 cm² were cut off from the sheets and exposed to ultraviolet light in a carbon arc Weather-O-Meter, to evaluate light stability. The % elongation retention after 350 hours irradiation in the carbon arc was measured.

Heat stability was evaluated in an air circulating oven at 160° C.

In each test, the time in hours required for the sheet to develop a noticeable discoloration and/or embrittlement was noted as the hours to failure.

The results obtained are shown in Table II.

TABLE I-continued

| Example No. | Piperidyl Ester | β-Thioalkyl Propionic Acid Ester | Hours to Failure |
| --- | --- | --- | --- |
| 7 | (structure) | $(C_{18}H_{37}SC_2H_4COOCH_2)_4$–C | 595 |
| 8 | (structure) | $(C_{12}H_{25}SC_2H_4COOCH_2)_3$–C–CH$_3$ | 540 |

TABLE II

| Example No. | Piperidyl Ester | β-Thioalkyl Propionic Acid Ester | Phenol | % Elongation Retention | Hours to Failure |
|---|---|---|---|---|---|
| Control 1 | None | (C₁₂H₂₅SC₂H₄COOCH₂)₄—C | Stearyl-β-(3,5-di-t-butyl-4-hydroxyphenyl)propionate | 12.3 | 680 |
| Control 2 | 2-hydroxy-4-octoxybenzophenone | (C₁₂H₂₅SC₂H₄COOCH₂)₃—C—CH₃ | Stearyl-β-(3,5-di-t-butyl-4-hydroxyphenyl)propionate | 24.9 | 820 |
| Control 3 | [structure: 2,2,6,6-tetramethyl-4-piperidyl ester with CH₂—COO—CH₂ and HO—C—COO—CH₂ linkages] | Dilauryl thiodipropionate | stearyl-β-(3,5-di-t-butyl-4-hydroxyphenyl)propionate | 41.5 | 710 |
| 9 | [structure: N[—CH₂COO—(2,2,6,6-tetramethyl-4-piperidyl)]₃] | (C₁₂H₂₅SC₂H₄COOCH₂)₄—C | Stearyl-β-(3,5-di-t-butyl-4-hydroxyphenyl)propionate | 63.4 | 970 |

TABLE II-continued

| Example No. | Piperidyl Ester | β-Thioalkyl Propionic Acid Ester | Phenol | % Elongation Retention | Hours to Failure |
|---|---|---|---|---|---|
| 10 | [structure: bis(2,2,6,6-tetramethyl-4-piperidyl) diester with N,N'-bis(ethylene) isocyanurate bridge] | (C₁₂H₂₅SC₂H₄COOCH₂)₃—C | Stearyl-β-(3,5-di-t-butyl-4-hydroxyphenyl) propionate | 61.0 | 950 |
| 11 | [structure: tris(2,2,6,6-tetramethyl-4-piperidyl) citrate-type ester] | (C₂₂H₄₅SC₂H₄COOCH₂)₄C | Stearyl-β-(3,5-di-t-butyl-4-hydroxyphenyl) propionate | 59.7 | 1070 |
| 12 | [structure: bis(2,2,6,6-tetramethyl-4-piperidyl) sebacate-type diester] | C₁₂H₂₅SC₂H₄COO—CH₂<br>C₁₂H₂₅SC₂H₄COO—CH<br>C₁₂H₂₅SC₂H₄COO—CH₂ | Tetrakis-(methylene-3-(3,5-di-t-butyl-4-hydroxyphenyl) propionate)methane | 62.2 | 1230 |

TABLE II-continued
| Example No. | Piperidyl Ester | β-Thioalkyl Propionic Acid Ester | Phenol | % Elongation Retention | Hours to Failure |
|---|---|---|---|---|---|
| 13 | 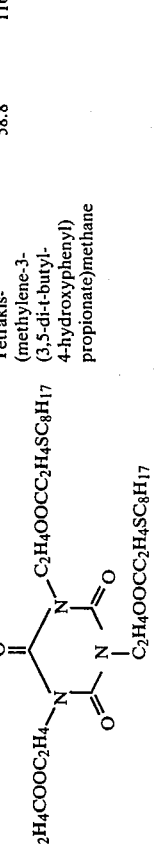 |  | Tetrakis-(methylene-3-(3,5-di-t-butyl-4-hydroxyphenyl)propionate)methane | 58.8 | 1160 |
| 14 |  | 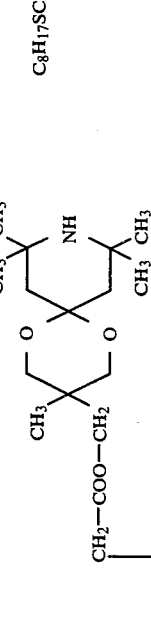 | Tetrakis-(methylene-3-(3,5-di-t-butyl-4-hydroxyphenyl)propionate)methane | 60.0 | 1190 |
| 15 | 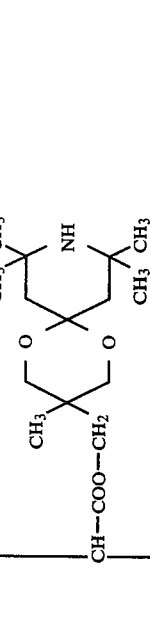 | 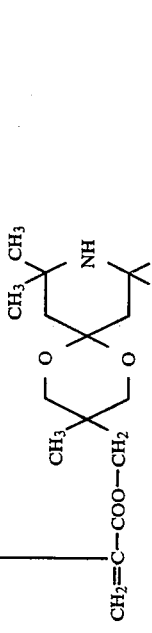 | Tris-3,5-di-t-butyl-4-hydroxy-benzyl isocyanurate | 60.6 | 1210 |

It is apparent from the above results that the compositions of the invention are superior stabilizers in enhancing the resitance of the polypropylene polymer composition to deterioration in the presence of ultraviolet light.

EXAMPLES 17 to 23

Ethylene-vinyl acetate copolymer compositions were prepared using stabilizer compositions of the invention and having the following formulation:

| Ingredient | Parts by Weight |
| --- | --- |
| Ethylene-vinylacetate copolymer | 100 |
| 4,4'-n-Butylidene bis-(2-t-butyl-5-methylphenol) carbonate oligomer (polymerization degree 4) | 0.1 |
| Ca-stearate | 0.1 |
| Zn-stearate | 0.1 |
| Diisodecylphenyl phosphite | 0.2 |
| Piperidyl ester as shown in Table III | 0.3 |
| β-Thioalkyl propionic acid ester as shown in Table III | 0.2 |

The stabilizer composition was blended with the polymer on a two-roll mill at 130° C., and sheets 0.4 mm thick were then compression molded, at 140° C. from the resulting blend. Pieces 2.5 cm² were cut off from the sheets and exposed to ultravilet light in a Weathr-O-Meter for 500 hours. At the start and at the conclusion of the test, the tensilt strength of the sheet samples was determined.

Heat stability was evaluated in a Geer forced air oven at 175° C.

The results are given in Table III as % retention of the initially determined tensile strength, and minutes to failure in the oven test.

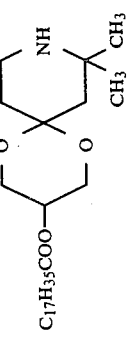

TABLE II-continued

| Example No. | Piperidyl Ester | β-Thioalkyl Propionic Acid Ester | Phenol | % Elongation Retention | Hours to Failure |
| --- | --- | --- | --- | --- | --- |
| 16 | (structure shown) | (C$_8$H$_{17}$SC$_2$H$_4$COO)$_6$sorbitol | Tris-3,5-di-t-butyl-4-hydroxy-benzyl isocyanurate | 58.4 | 1040 |

TABLE III

| Ex. No. | Piperidyl Ester | β-Thioalkyl Propionic Acid Ester | % Retention of tensile strength | (Oven heating) Minutes to Failure |
|---|---|---|---|---|
| Control 1 | None | $(C_8H_{17}SC_2H_4COOCH_2)_3C-C_2H_5$ | 51 | 90 |
| Control 2 | | Dilauryl thiodipropionate | 68 | 60 |
| 17 | structure with spiro piperidine and hindered phenol | $\begin{array}{c} C_{12}H_{25}SC_2H_4COOC_2H_4 \\ \end{array}$ triazine structure with $C_2H_4OOCC_2H_4SC_{12}H_{25}$ groups | 82 | 120 |
| 18 | bis-spiro piperidine structure | $(C_{12}H_{25}SC_2H_4COOCH_2)_4C$ | 81 | 120 |
| 19 | spiro piperidine with norbornene diester | $(C_8H_{17}SC_2H_4COOCH_2)_3C-C_2H_5$ | 83 | 120 |

TABLE III-continued

| Ex. No. | Piperidyl Ester | β-Thioalkyl Propionic Acid Ester | % Retention of tensile strength | (Oven heating) Minutes to Failure |
|---|---|---|---|---|
| 20 | (structure: bis-piperidyl spiro dioxane with CH$_2$—COO—CH$_2$ and CH—COO—CH$_2$ linkages via CH$_2$=C—COO—CH$_2$) | (C$_{18}$H$_{37}$SC$_2$H$_4$COOCH$_2$)$_4$C | 84 | 105 |
| 21 | [piperidyl spiro dioxane —C$_2$H$_4$COO—CH$_2$ ]$_3$N | (C$_{14}$H$_{29}$SC$_2$H$_4$COOCH$_2$)$_4$C | 81 | 120 |

TABLE III-continued

| Ex. No. | Piperidyl Ester | β-Thioalkyl Propionic Acid Ester | % Retention of tensile strength | (Oven heating) Minutes to Failure |
|---|---|---|---|---|
| 22 | (complex structure) | $(C_4H_9SC_2H_4COOCH_2)_3$—C—$CH_3$ | 80 | 105 |
| 23 | (complex structure) | $[(C_{12}H_{25}SC_2H_4COOCH_2)_2$—C—$CH_2$—O$]_2$ with $C_2H_5$ | 81 | 105 |

It is apparent from the results that the stabilizer compositions in accordance with the invention are superior in enhancing the resistance of the ethylene-vinyl acetate copolymer to deterioration in the presence of ultraviolet light, and at elevated temperature.

EXAMPLES 24 to 29

High density polyethylene compositions were prepared using stabilizer compositions of the invention, and having the following formulation:

| Ingredient | Parts by Weight |
|---|---|
| High-density polyethylene | 100 |
| Calcium stearate | 1.0 |
| Tetrakis(methylene-3-(3,5-di-t-butyl-4-hydroxyphenyl)propionate)methane | 0.1 |
| Piperidyl ester as shown in Table IV | 0.3 |
| β-Thioalkyl propionic acid ester as shown in Table IV | 0.3 |

The stabilizer composition was blended with the polymer on a two-roll mill and sheets 0.5 mm thick were prepared by compression molding of the blend. Pieces 2.5 cm$^2$ were cut off from the sheets, and exposed in a Weather-O-Meter to ultraviolet light.

Heat stability was evacuated in a Geer oven at 150° C.

In each case the time in hours when degradation set in, as determined by a significant discoloration and/or embrittlement, was noted as hours to failure, and the results are reported in Table IV.

TABLE IV

| Example No. | Piperidyl Ester | β-Thioalkyl Propionic Acid Ester | Hours to failure | Oven |
|---|---|---|---|---|
| Control 1 | None | $C_{12}H_{25}SC_2H_4COO-CH_2$<br>$C_{12}H_{25}SC_2H_4COO-CH$<br>$C_{12}H_{25}SC_2H_4COO-CH_2$ | 390 | 524 |
| Control 2 | [bis-piperidyl triazine-trione structure] | Distearyl thiodipropionate | 710 | 395 |
| 24 | [bis-piperidyl sebacate structure] | $(C_{18}H_{37}SC_2H_4COOCH_2)_4C$ | 1020 | 617 |
| 25 | [piperidyl dioxaspiro structure] | $C_{12}H_{25}SC_2H_4COO-CH_2$<br>$C_{12}H_{25}SC_2H_4COO-CH$<br>$C_{12}H_{25}SC_2H_4COO-CH_2$ | 970 | 600 |

TABLE IV-continued

| Example No. | Piperidyl Ester | β-Thioalkyl Propionic Acid Ester | Hours to failure | Oven |
|---|---|---|---|---|
| 26 | Spiro-piperidyl ester mixture: CH$_2$—COO—CH$_2$, CH—COO—CH$_2$, CH$_2$=C—COO—CH$_2$ linked to 2,2,6,6-tetramethylpiperidine spiro-dioxane units | $C_{18}H_{37}SC_2H_4COOC_2H_4$—N (triazinetrione ring) with N—$C_2H_4OOCC_2H_4SC_{18}H_{37}$ and N—$C_2H_4OOCC_2H_4SC_{18}H_{37}$ | 1150 | 612 |
| 27 | Triazine-2,4,6-trione bearing N—CH$_2$COO— and —OOCCH$_2$—N substituents linked to 2,2,6,6-tetramethyl-4-piperidyl groups, and a third N—CH$_2$COO—CH$_2$ to 2,2,6,6-tetramethyl-4-piperidyl | $[(C_{12}H_{25}SC_2H_4COOCH_2)_2 \text{-}C(C_2H_5)\text{-}CH_2\text{-}O\text{-}]_2$ C=O | 950 | 585 |

TABLE IV-continued

| Example No. | Piperidyl Ester | β-Thioalkyl Propionic Acid Ester | Hours to failure | Oven |
|---|---|---|---|---|
| 28 | ![structure with two piperidyl esters linked via CHCH₂CH] | $(C_8H_{17}SC_2H_4COOCH_2)_3C-C_2H_5$ | 990 | 593 |
| 29 | ![structure with piperazine linker and piperidyl esters] | $(C_{12}H_{25}SC_2H_4COOCH_2)_4C$ | 1080 | 628 |

The stabilizer compositions of the invention are clearly superior to the controls in enhancing resistance of the polyethylene to degradation under ultraviolet light and at elevated temperature.

EXAMPLES 30 to 35

Acrylonitrile-butadiene-styrene terpolymer resin compositions were prepared using stabilizers of the invention and having the following formulation:

| Ingredient | Parts by Weight |
|---|---|
| Acrylonitrile-butadiene-styrene terpolymer | 100 |
| 4,4-Butylidene bis-(2-tert-butyl-p-cresol) | 0.1 |
| Piperidyl ester as shown in Table V | 0.2 |
| β-Thioalkyl propionic acid ester as shown in Table V | 0.1 |

The stabilizer composition was blended with the resin on a two-roll mill, and sheets 3 mm thick were prepared by compression-molding of the resulting blend. Pieces 2.5 cm$^2$ were cut off from the sheets, and subjected to ultraviolet light in a Weathr-O-Meter for 800 hours. Tensile strength before and after the test exposure was determined, and the results reported as the percent of tensile strength retained, at the end of this time, in Table V.

Heat stability was evaluated by heating at 210° C. under a stress of 50 kg/cm$^2$ for ten minutes, and then noting color on a scale from 1 to 10 in which 10 is brown and 1 is white. Color is reported in Table V.

TABLE V

| Example No. | Piperidyl Ester | β-Thioalkyl Propionic Acid Ester | % Retention of tensile strength | Color of sheet after heating |
|---|---|---|---|---|
| Control 1 | None | None | 41 | 8 |
| Control 2 | 2-Hydroxy-4-octoxy-benzophenone | $[(C_{18}H_{37}SC_2H_4COOCH_2)_2C-CH_2-O]_2$ $CH_3$ | 63 | 4 |
| 30 | (spiro piperidyl dioxane with $C_{17}H_{35}COO$ substituent) | $(C_{14}H_{29}SC_2H_4COOCH_2)_4C$ | 78 | 3 |
| 31 | (tris-piperidyl ester of propane-1,2,3-tricarboxylic acid derivative) | $[(C_{18}H_{37}SC_2H_4COOCH_2)_2C-CH_2-O]_2$ $CH_3$ | 83 | 3 |

TABLE V-continued

| Example No. | Piperidyl Ester | β-Thioalkyl Propionic Acid Ester | % Retention of tensile strength | Color of sheet after heating |
|---|---|---|---|---|
| 32 | (structure) | (structure with C₁₂H₂₅SC₂H₄COOC₂H₄– and N–C₂H₄OOCC₂H₄SC₁₂H₂₅ groups) | 81 | 2 |
| 33 | (structure) | $(C_{12}H_{25}SC_2H_4COOCH_2)_3C$ | 81 | 2 |

TABLE V-continued

| Example No. | Piperidyl Ester | β-Thioalkyl Propionic Acid Ester | % Retention of tensile strength | Color of sheet after heating |
|---|---|---|---|---|
| 34 | piperidyl ester structure (bis-piperidyl ester with C=C central linkage) | $(C_{18}H_{37}SC_2H_4COOCH_2)_3C-C_2H_5$ | 76 | 3 |
| 35 | tris-piperidyl ester structure | $(C_{18}H_{37}SC_2H_4COOCH_2)_4C$ | 82 | 2 |

It is apparent that the stabilizer compositions of the invention are more effective as ultraviolet light and heat stabilizers for ABS terpolymers than the Controls.

EXAMPLES 36 to 41

Polybutylene terephthalate resin compositions were prepared having the following compositions:

| Ingredient | Parts by Weight |
|---|---|
| Polybutylene terephthalate | 100 |
| 1,3,5-Trimethyl-2,4,6-tris-(3,5-di-butyl-4-hydroxy benzyl) benzene | 0.1 |
| Piperidyl ester as shown in Table VI | 0.2 |
| β-Thioalkyl propionic acid ester as shown in Table VI | 0.1 |

The compositions were extruded to form pellets, and then test pieces were molded from the pellets by injection molding at 270° C. Test pieces were irradiated with ultraviolet light for 500 hours in a Weather-O-Meter. Other test pieces were heated in an air oven at 150° C. for 240 hours to determine heat stability. Tensile strength before and after the test was determined, and the present tensile strength retained in each test is given in Table VI.

TABLE VI

| Example No. | Piperidyl Ester | β-Thioalkyl Propionic Acid Ester | % Retention Tensile Strength (irradiation) | (heating) |
|---|---|---|---|---|
| Control 1 | None | None | 46 | 54 |
| Control 2 | bis(2,2,6,6-tetramethyl-4-piperidyl) 5-[(2,2,6,6-tetramethyl-4-piperidyl)oxycarbonyl]benzene-1,3-dicarboxylate | Dilauryl thiodipropionate | 69 | 62 |
| 36 | 2,2,6,6-tetramethyl-4-piperidyl benzoate | $(C_{12}H_{25}SC_2H_4COOCH_2)_3{-}C{-}CH_3$ | 78 | 80 |
| 37 | bis(2,2,6,6-tetramethyl-4-piperidyl) sebacate-type structure with $OCC_8H_{16}CO$ linker | 1,3,5-tris[$C_{18}H_{37}SC_2H_4COOC_2H_4$ / $C_2H_4OOCC_2H_4SC_{18}H_{37}$]isocyanurate | 80 | 83 |

TABLE VI-continued
| Example No. | Piperidyl Ester | β-Thioalkyl Propionic Acid Ester | % Retention Tensile Strength (irradiation) | (heating) |
|---|---|---|---|---|
| 38 | 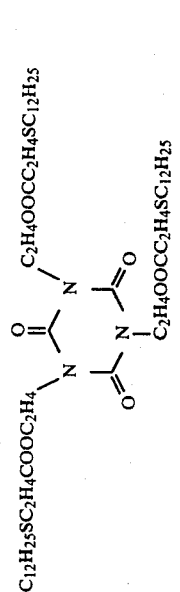 | 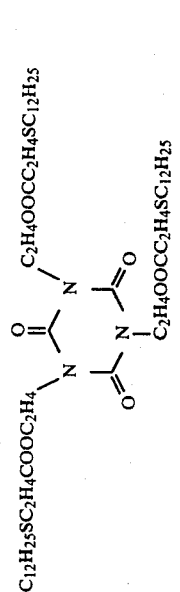 | 82 | 82 |
| 39 | 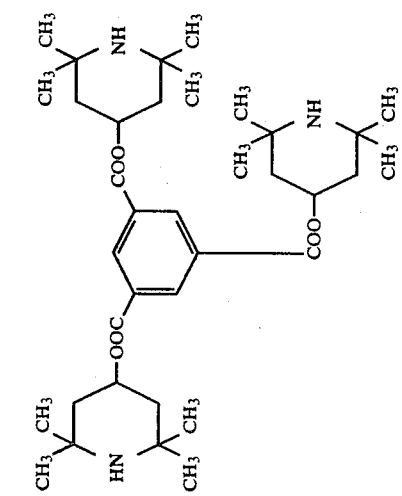 | 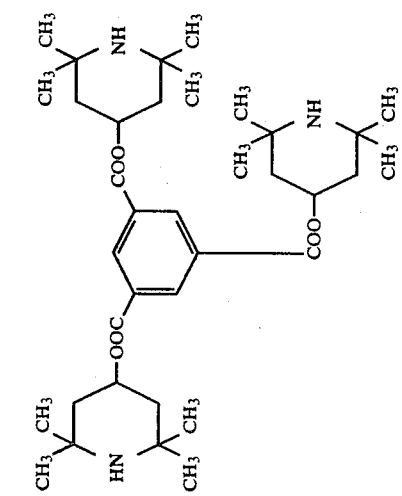 | 83 | 85 |

TABLE VI-continued

| Example No. | Piperidyl Ester | β-Thioalkyl Propionic Acid Ester | % Retention Tensile Strength (irradiation) | % Retention Tensile Strength (heating) |
|---|---|---|---|---|
| 40 | (tetra-piperidyl ester of benzene-1,2,4,5-tetracarboxylic acid, where each piperidyl is 2,2,6,6-tetramethyl-4-piperidyl) | $(C_{22}H_{45}SC_2H_4COOCH_2)_4$—C | 84 | 77 |
| 41 | (pentaerythritol-based tetraester with 2,2,6,6-tetramethyl-4-piperidyl groups and CH$_3$COO— substituent) | $(C_{12}H_{25}SC_2H_4COOCH_2)_4$—C | 80 | 85 |

It is apparent that the stabilizers of the invention are effective ultraviolet light and heat stabilizers for polyester resins.

EXAMPLES 42 to 46

Stabilizer compositions of the invention were blended with polyurethane resins in the following formulation:

| Ingredient | Parts by Weight |
| --- | --- |
| Polyurethane (Asahi 0-100)[1] | 100 |
| Ca-stearate | 0.7 |
| Zn-stearate | 0.3 |
| 2,6-di-t-butyl-p-cresol | 0.1 |
| Octyl diphenyl phosphite | 0.2 |
| Piperidyl ester as shown in Table VII | 0.3 |
| β-Thioalkyl propionic acid ester as shown in Table VII | 0.1 |

[1] A polyurethane-isocyanurate made from toluene diisocyanate and alkylene polyol.

The stabilizer composition was blended with the resin and other ingredients on a two-roll mill at 70° C. for 5 minutes and compression-mold at 120° C. for 5 minutes to form sheets 0.5 mm thick. The sheets were subjected to irradiation in a Weather-O-Meter for 30 hours.

Elongation retention before and after irradiation was measured and the percent elongation retention determined. Heat stability was also measured in a Geer oven at 175° C., and the results noted as minutes to failure.

The results are shown in Table VII.

TABLE VII

| Example No. | Piperidyl Ester | β-Thioalkyl Propionic Acid Ester | % Elongation Retention | Heat Stability |
|---|---|---|---|---|
| Control 1 | None | None | 41 | 75 |
| 42 | Tris(2,2,6,6-tetramethyl-4-piperidyl) ester of 1,1,2-ethanetricarboxylic acid (CH₂—COO, CH—COO, CH₃—CH—COO each bonded to 2,2,6,6-tetramethyl-4-piperidyl) | Structure with two imide rings bearing C₂H₄OOCC₂H₄SC₁₈H₃₇ groups and C₁₈H₃₇SC₂H₄COOC₂H₄ linker | 78 | 120 |
| 43 | [N—CH₂COO—(2,2,6,6-tetramethyl-4-piperidyl)]₃ | Structure with two imide rings bearing C₂H₄OOCC₂H₄SC₁₂H₂₅ groups and C₁₂H₂₅SC₂H₄COOC₂H₄ linker | 80 | 120 |

TABLE VII-continued

| Example No. | Piperidyl Ester | β-Thioalkyl Propionic Acid Ester | % Elongation Retention | Heat Stability |
|---|---|---|---|---|
| 44 | ![structure: 1,3,5-benzene tricarboxylate of 2,2,6,6-tetramethyl-4-piperidyl] | $(C_4H_9SC_2H_4COOCH_2)_3$—C—$CH_3$ | 81 | 105 |
| 45 | ![structure: tetrakis piperidyl ester of butanetetracarboxylic acid] | $(C_{18}H_{37}SC_2H_4COOCH_2)_4$—C | 77 | 105 |
| 46 | ![structure: bis piperidyl ester of piperazine-N,N'-dipropionate] | $(C_{12}H_{25}SC_2H_4COOCH_2)_4$—C | 83 | 120 |

It is apparent from the data that the stabilizer compositions of the invention are superior to the controls.

Having regard to the foregoing disclosure, the following is claimed as inventive and patentable embodiments thereof:

1. A stabilizer composition for organic polymeric materials comprising:
(a) aβ-thioalkyl propionic acid ester of a polyhydric alcohol in an amount of from about 10 to about 35 parts by weight;
(b) a phenolic antioxidant in an amount of from about 10 to about 35 parts by weight; and
(c) a 2,2,6,6-tetramethyl-4-piperidyl carboxylic acid ester in an amount from about 90 to about 35 parts by weight and having the general formula:

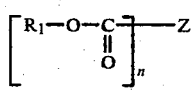

wherein:
$R_1$ is selected from the group consisting of

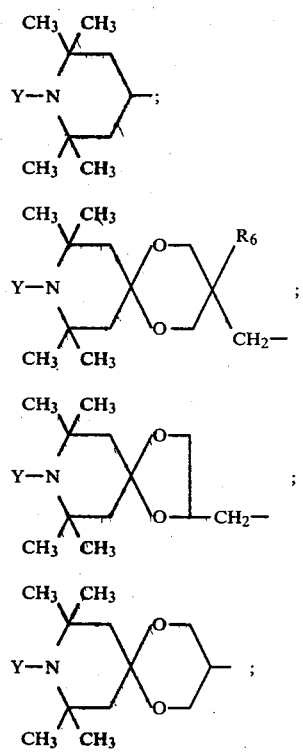

Y is selected from the group consisting of hydrogen and O;
$R_6$ is lower alkyl having from one to two carbon atoms;
n is selected from the group consisting of 1, 2, 3 and 4; and
Z is an organic radical having a valence from 1 to 4, the valence positions being taken by

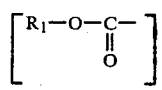

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene alkarylidene; tris (N,N',N''-alkylene) cyanuric acid; bis (N,N'-alkylene) piperazine; cycloalkyl, cycloalkenyl, cycloalkylene, cycloalkenylene, cycloalkylidene, alkcycloalkyl, alkcycycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

2. A stabilizer composition according to claim 1 in which n is one.

3. A stabilizer composition according to claim 1 in which n is two.

4. A stabilizer composition according to claim 1 in which n is three.

5. A stabilizer composition according to claim 1 in which n is four.

6. A stabilizer composition according to claim 1 in which Z is alkyl.

7. A stabilizer composition according to claim 1 in which Z is alkylene.

8. A stabilizer composition according to claim 1 in which Z is alkyl hydroxyphenalkylene.

9. A stabilizer composition according to claim 1 in which Z is aminoalkylene.

10. A stabilizer composition according to claim 1 in which Z is arylene.

11. A stabilizer composition according to claim 1 in which Z is cycloalkylene.

12. A stabilizer composition according to claim 1 in which Z is

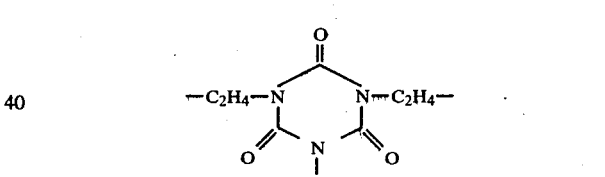

13. A stabilizer composition according to claim 1 in which $R_1$ is

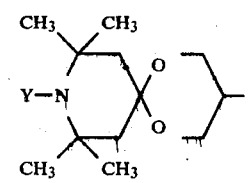

14. A stabilizer composition according to claim 1 in which $R_1$ is

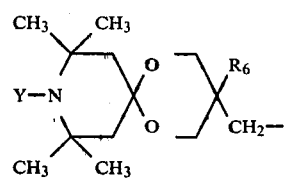

15. A stabilizer composition according to claim 1 in which $R_1$ is

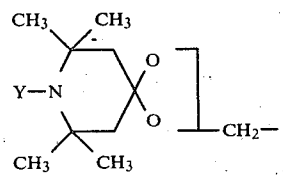

16. A stabilizer composition according to claim 1 in which $R_1$ is

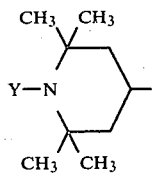

17. A stabilizer composition according to claim 1 in which the β-thioalkyl propionic acid ester has the formula:

$$[R-S-CH_2CH_2COO]_m-A$$

wherein:
m is a number from three to six;
R is a long chain alkyl group having from about four to about thirty carbon atoms; and
A is the residue of a polyhydric alcohol having from three to six hydroxyl groups esterified with R—S—CH$_2$CH$_2$CO—groups and from three to about thirty carbon atoms.

18. A stabilizer composition according to claim 17 in which the A polyol residue is selected from the group consisting of alkylene and arylene.

19. A stabilizer composition according to claim 18 in which A is alkylene.

20. A stabilizer composition according to claim 1 in which the phenolic antioxidant has at least one phenolic hydroxyl group, at least one phenolic nucleus, and from about eight to about three hundred carbon atoms.

21. A stabilizer composition according to claim 20 in which the phenolic nucleus has two phenolic rings interconnected by an oxy or thio ether group.

22. A stabilizer composition according to claim 20 in which the phenol is a monocyclic phenol having the formula:

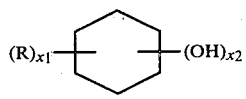

wherein
R is selected from the group consisting of hydrogen; halogen; and organic radicals selected from the group consisting of alkyl, aryl, alkenyl, alkaryl, aralkyl, cycloalkenyl, cycloalkyl, alkoxy, and acyl $$(R'C-),$$
$$\quad \|$$
$$\quad O$$

where R' is aryl, alkyl or cycloalkyl containing from one to about thirty carbon atoms; and
$x_1$ and $x_2$ are integers from one to four, and the sum of $x_1$ and $x_2$ does not exceed six.

23. A stabilizer composition according to claim 20 in which the phenol is a polycyclic phenol having at least two aromatic nuclei linked by a polyvalent linking radical, defined by the formula:

$$\begin{array}{cc} (Ar)_{n1}-Y-(Ar)_{n2} \\ | & | \\ (OH)_{m1} & (OH)_{m2} \end{array}$$

wherein
Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups having from one up to twenty carbon atoms;
Ar is a phenolic nucleus and each Ar group contains at least one free phenolic hydroxyl group up to a total of five;
$m_1$ and $m_2$ are numbers from one to five; and
$n_1$ and $n_2$ are numbers from one to four.

24. A stabilizer composition according to claim 20 in which the phenol is polyhydric polycyclic phenol having the structure:

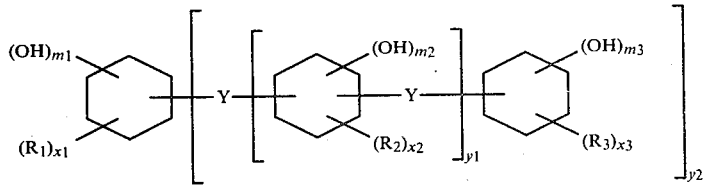

wherein
$R_1$, $R_2$ and $R_3$ are inert substituents selected from the group consisting of halogen, alkyl, aryl, alkaryl, aralkyl, cycloalkenyl, cycloalkyl, alkoxy, aryloxy, acyloxy

where R' is alkyl or cycloalkyl, and thiohydrocarbon, all having from one to about thirty carbon atoms, and carboxyl

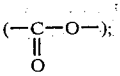

$m_1$ and $m_3$ are integers from one to a maximum of five;
$m_2$ is an integer from one to a maximum of four;
$x_1$ and $x_3$ are integers from zero to four, and $x_2$ is an integer from zero to three;
$y_1$ is an integer from zero to about six; and
$y_2$ is an integer from one to five.

25. A polyvinyl chloride resin composition having improved resistance to deterioration when heated at 350° F., comprising a polyinyl chloride resin formed at least in part of the recurring group

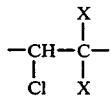

and having a chlorine content in excess of 49% where X is either hydrogen or chlorine; and an amount to enhance the resistance to deterioration of the resin of a stabilizer composition comprising:
(a) aβ-thioalkyl propionic acid ester of a polyhydric alcohol in an amount of from about 10 to about 35 parts by weight;
(b) a phenolic antioxidant in an amount of from about 10 to about 35 parts by weight; and
(c) a 2,2,6,6-tetramethyl-4-piperidyl carboxylic acid ester in an amount from about 90 to about 35 parts by weight and having the general formula:

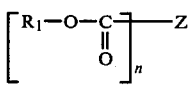

wherein:
$R_1$ is selected from the group consisting of

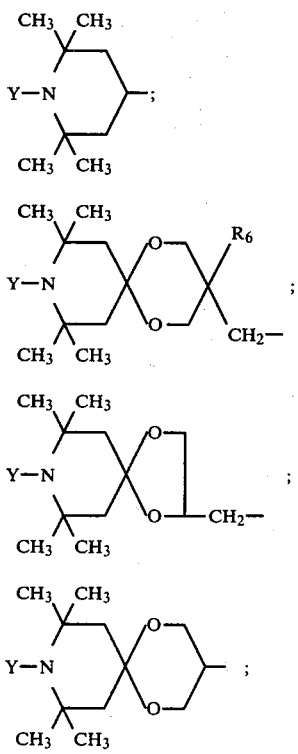

Y is selected from the group consisting of hydrogen and O·;
$R_6$ is lower alkyl having from one to two carbon atoms;

n is selected from the group consisting of 1, 2, 3 and 4; and
Z is an organic radical having a valence from 1 to 4, the valence positions being taken by

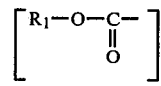

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalk alkenyl, cycloalkalkenylene, aminoalkylene, nitriloalkylene, hydroxyalkylene and alkylhydroxyphenalkylene.

26. A polyvinyl chloride resin composition in accordance with claim 25 in which the polyvinyl chloride resin is polyvinyl chloride homopolymer.

27. A polyvinyl chloride resin composition in accordance with claim 25 in which the polyvinyl chloride resin is a copolymer of vinyl chloride and vinyl acetate.

28. An olefin polymer composition having improved resistance to deterioration comprising an olefin polymer selected from the group consisting of polymers of alpha-olefins having from two to six carbon atoms and polystyrene, and an amount to enhance the resistance of the polymer to deterioration of a stabilizer composition comprising:
(a) a β-thioalkyl propionic acid ester of a polyhydric alcohol in an amount of from about 10 to about 35 parts by weight;
(b) a phenolic antioxidant in an amount of from about 10 to about 35 parts by weight; and
(c) a 2,2,6,6-tetramethyl-4-piperidyl carboxylic acid ester in an amount from about 90 to about 35 parts by weight and having the general formula:

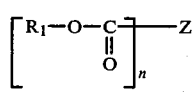

wherein:
$R_1$ is selected from the group consisting of

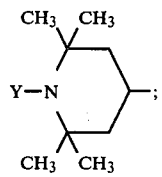

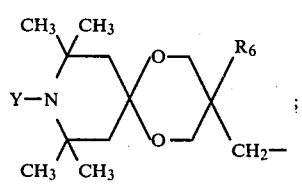

-continued

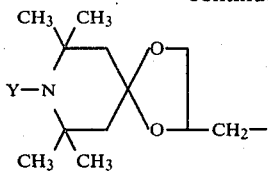

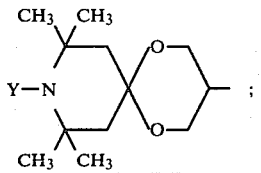

Y is selected from the group consisting of hydrogen and O·;

$R_6$ is lower alkyl having from one to two carbon atoms;

n is selected from the group consisting of 1, 2, 3 and 4; and

Z is an organic radical having a valence from 1 to 4, the valence positions being taken by

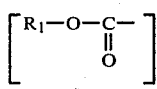

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

29. An olefin polymer composition in accordance with claim 28 wherein the polyolefin is polypropylene.

30. An olefin polymer composition in accordance with claim 28 wherein the polyolefin is polyethylene.

31. An acrylonitrile-butadiene-styrene polymer having improved resistance to deterioration when heated at 300° F. comprising an acrylonitrile-butadiene-styrene polymer and an amount to enhance its resistance to deterioration of a stabilizer composition comprising:

(a) a β-thioalkyl propionic acid ester of a polyhydric alcohol in an amount of from about 10 to about 35 parts by weight;

(b) a phenolic antioxidant in an amount of from about 10 to about 35 parts by weight; and (c) a 2,2,6,6-tetramethyl-4-piperidyl carboxylic acid ester in an amount from about 90 to about 35 parts by weight and having the general formula:

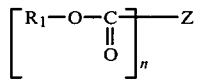

wherein:

$R_1$ is selected from the group consisting of

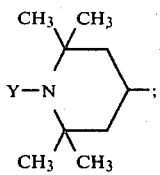

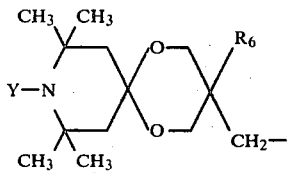

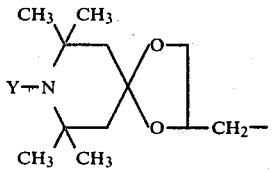

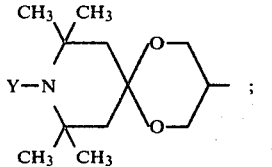

Y is selected from the group consisting of hydrogen and O·;

$R_6$ is lower alkyl having from one to two carbon atoms;

n is selected from the group consisting of 1, 2, 3 and 4; and

Z is an organic radical having a valence from 1 to 4, the valence positions being taken by

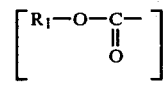

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

32. A polyester resin composition having improved resistance to deterioration comprising a linear polyester resin and an amount to enhance the resistance of the polymer to deterioration of a stabilizer coposition comprising:

(a) a β-thioalkyl propionic acid ester of a polyhydric alcohol in an amount of from about 10 to about 35 parts by weight;

(b) a phenolic antioxidant in an amount of from about 10 to about 35 parts by weight; and (c) a 2,2,6,6-tetramethyl-4-piperidyl carboxylic acid ester in an amount from about 90 to about 35 parts by weight and having the general formula:

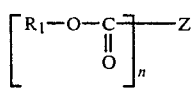

wherein:
$R_1$ is selected from the group consisting of

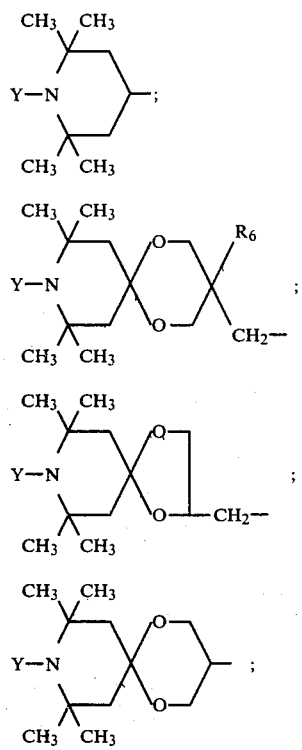

Y is selected from the group consisting of hydrogen and O·;
$R_6$ is lower alkyl having from one to two carbon atoms;
n is selected from the group consisting of 1, 2, 3 and 4; and
Z is an organic radical having a valence from 1 to 4, the valence positions being taken by

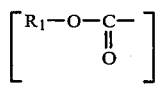

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

33. An ethylene-vinyl acetate copolymer composition having improved resistance to deterioration comprising an ethylene-vinyl acetate copolymer and an amount to enhance the resistance of the polymer to deterioration of a stabilizer composition comprising:
(a) a β-thioalkyl propionic acid ester of a polyhydric alcohol in an amount of from about 10 to about 35 parts by weight;
(b) a phenolic antioxidant in an amount of from about 10 to about 35 parts by weight; and
(c) a 2,2,6,6-tetramethyl-4-piperidyl carboxylic acid ester in an amount from about 90 to about 35 parts by weight and having the general formula:

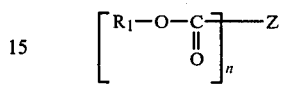

wherein:
$R_1$ is selected from the group consisting of

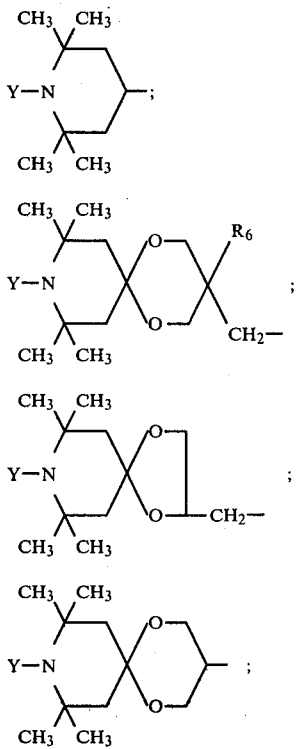

Y is selected from the group consisting of hydrogen and O·;
$R_6$ is lower alkyl having from one to two carbon atoms;
n is selected from the group consisting of 1, 2, 3 and 4; and
Z is an organic radical having a valence from 1 to 4, the valence positions being taken by

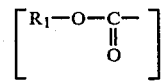

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

34. A polyurethane resin composition having improved resistance to deterioration comprising a polyurethane resin and an amount sufficient to improve resistance to deterioration of the resin of a stabilizer composition comprising:
(a) a β-thioalkyl propionic acid ester of a polyhydric alcohol in an amount of from about 10 to about 35 parts by weight;
(b) a phenolic antioxidant in an amount of from about 10 to about 35 parts by weight; and
(c) a 2,2,6,6-tetramethyl-4-piperidyl carboxylic acid ester in an amount from about 90 to about 35 parts by weight and having the general formula:

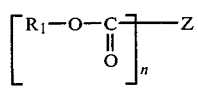

wherein:
$R_1$ is selected from the group consisting of

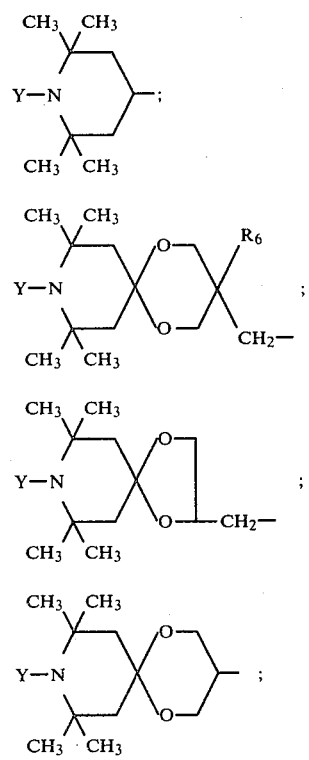

Y is selected from the group consisting of hydrogen and O·;

$R_6$ is lower alkyl having from one to two carbon atoms;
n is selected from the group consisting of 1, 2, 3 and 4; and
Z is an organic radical having a valence from 1 to 4, the valence positions being taken by

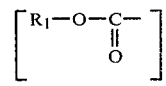

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkyl, cycloalkalkylene, cycloalkalkenyl, cycloalkalkenylene, aminoalkylene, nitriloalkylene, hydroxyalkylene and alkylhydroxyphenalkylene.

35. An olefin polymer composition having improved resistance to deterioration comprising an olefin polymer selected from the group consisting of polymers of alpha-olefins having from two to six carbon atoms and polystyrene, and an amount to enhance the resistance of the polymer to deterioration of a stabilizer composition comprising tetrakis (methylene-3-(3,5-di-t-butyl-4-hydroxyphenyl)propionate)methane in an amount from about 10 to about 35 parts by weight, 1,2,3-tris(lauryl mercaptopropionate) propane in an amount of from about 10 to about 35 parts by weight, and the piperidyl compound:

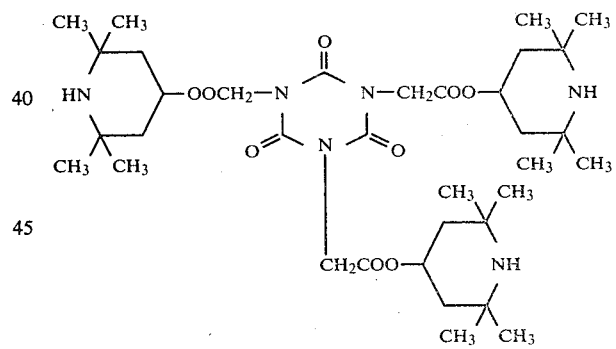

in an amount from about 90 to about 35 parts by weight.

36. A polyurethane resin composition having improved resistance to deterioration comprising a polyurethane resin and an amount to enhance the resistance of the polymer to deterioration of a stabilizer composition comprising 2,6-di-tert-butyl-p-cresol in an amount from about 10 to about 35 parts by weight, 1,3,5,-tris-(ethyl(lauryl mercapto propionate))isocyanurate in an amount of from about 10 to about 35 parts by weight, and tris-(2,2,6,6-tetramethyl-4-piperidyl)nitrilotriacetate in an amount from about 90 to about 35 parts by weight.

* * * * *

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above-identified patent and that said Letters Patent are hereby corrected as shown below:

[57] Abstract : Y is selected from the group consisting of hydrogen and O;

should be

Y is selected from the group consisting of hydrogen and O·;

Column 1, line 13 : after "chloride" please insert a --comma (,)--.
Column 3, line 53: "(-O.)" should be --(-O·)--.
Column 3, line 57: "and" should be --an--.
Column 5, lines 20 to 30:

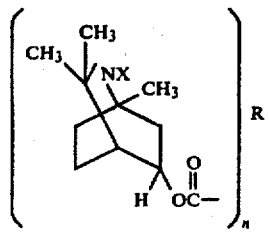    should be    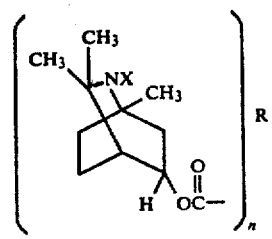

Column 6, lines 5 and 6:  —(CH$_2$-)$_m$Y(CH$_2$)$_n$—, should be

—(CH$_2$)$_m$Y(CH$_2$)$_n$—,

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above-identified patent and that said Letters Patent are hereby corrected as shown below:

Column 8, line 47 : "straght" should be --straight--.
Column 8, line 65 : "3,030,168" should be --3,939,168--.
Column 9, line 20 : "O." should be --O$^\bullet$--.
Column 9, line 24 : "O." should be --O$^\bullet$--.
Column 11, lines 25 to 33:

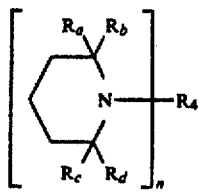  should be  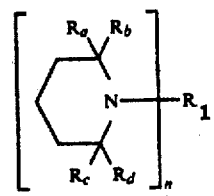

Column 11, line 50:

should be

Column 12, line 10: insert --or-- before "a".

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above-identified patent and that said Letters Patent are hereby corrected as shown below:

Column 13, line 1 to 8 :

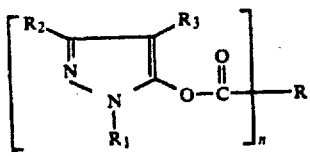   should be   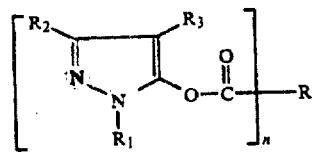

Column 13, line 11 : "$C_{5-32}$" should be --$C_{5-12}$--.

Column 13, line 32 : "hydroge" should be --hydrogen--.

Column 14, line 33 : "O" should be --O$^\cdot$--.

Column 16, line 1 : delete "cycloalkenyl" second occurrence.

Column 16, line 17 : "wich" should be --which--.

UNITED STATES PATENT AND TRADEMARK OFFICE
CERTIFICATE OF CORRECTION

PATENT NO. : 4,219,463

DATED : August 26, 1980

INVENTOR(S) : Motonobu Minagawa et al

It is certified that error appears in the above-identified patent and that said Letters Patent are hereby corrected as shown below:

Column 25, formula 26 :

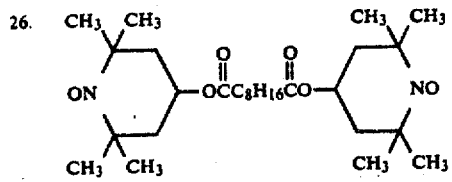 should be 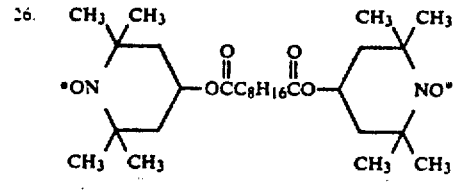

Column 25, formula 27:

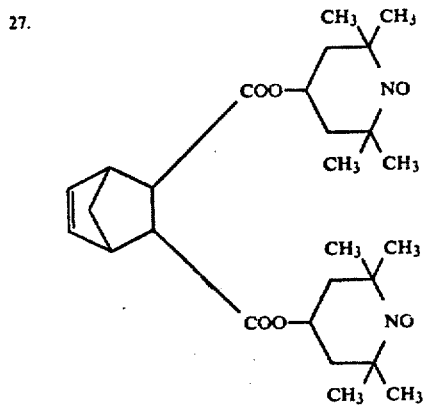 should be 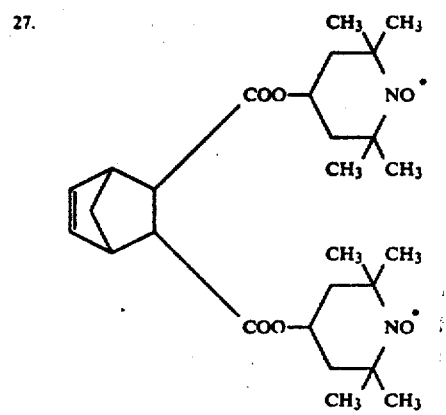

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above—identified patent and that said Letters Patent are hereby corrected as shown below:

Column 25, formula 28 :

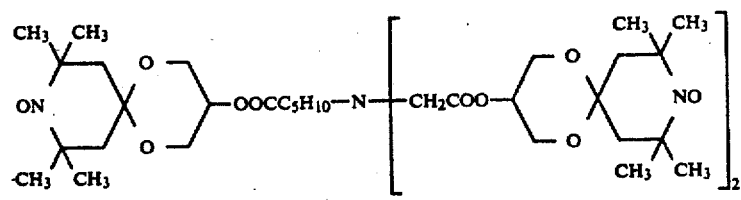

should be

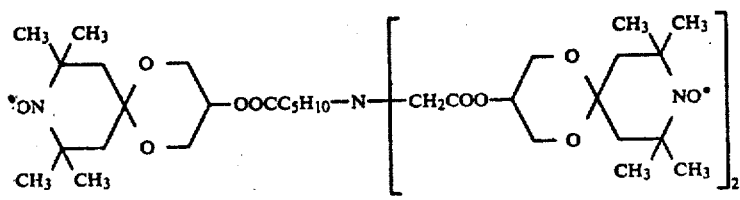

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above—identified patent and that said Letters Patent are hereby corrected as shown below:

Column 25, formula 29:

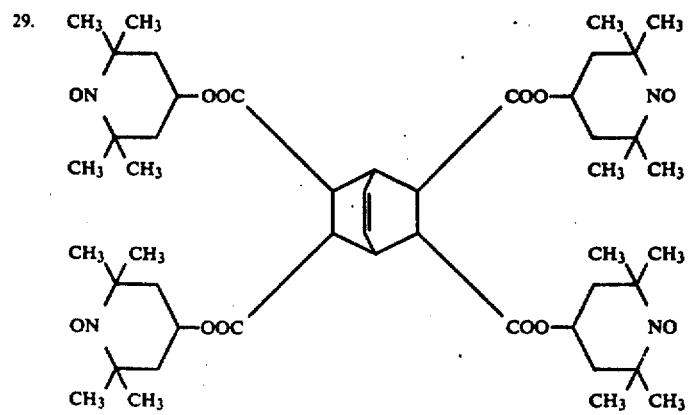

should be

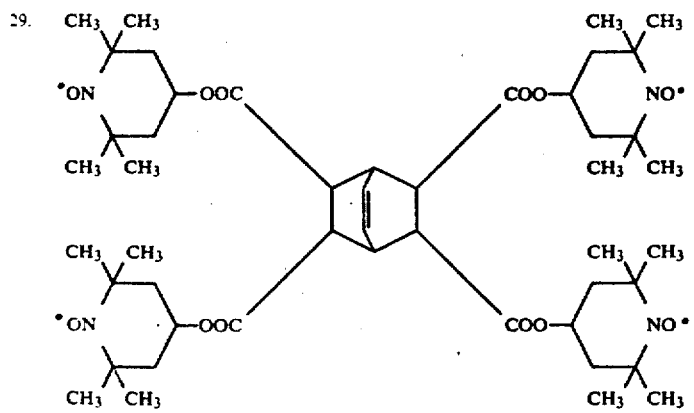

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above—identified patent and that said Letters Patent is hereby corrected as shown below:

Column 27, lines 36 and 37 :

$$R-$$
$$S-CH_2CH_2CO-$$

should be $$R-S-CH_2CH_2CO-$$

Column 32, line 68 and
Column 33, line 1 : "2,2'-methyl-bis" should be --2,2'-methylene-bis--

Column 33, line 52 : "butanedio" should be --butanediol--.
Column 35, line 34 : "thiodpropionic" should be --thiodipropionic--.
Column 35, lines 39 and 40, formula (c) :

(c) $R_1O[OCCH_2CH_2SCH_2CH_2COOX-O]-_nOCCH_2CH_2SCH_2CH_2COOZ$ should be (c) $R_1O[OCCH_2CH_2SCH_2CH_2COOX-O]_n$
$OCCH_2CH_2SCH_2CH_2COOZ$ Column 35, line 58 : delete "as" before "condensed".
Column 40, lines 15 and 16 : "3,9-diethoxyethoxyethyloxy)" should be --3,9-di(methoxyethoxyethyloxy--.

Column 40, line 49 : "diphoshite" should be --diphosphite--

UNITED STATES PATENT AND TRADEMARK OFFICE
CERTIFICATE OF CORRECTION

PATENT NO. : 4,219,463

DATED : August 26, 1980

INVENTOR(S) : Motonobu Minagawa et al

It is certified that error appears in the above—identified patent and that said Letters Patent is hereby corrected as shown below:

Column 41, line 50 : "polystryene" should be --polystryrene--

Column 42, line 49 : "system" should be --systems--.

Column 42, line 51 : "2, 3, 6, 6-" should be --2, 2, 6, 6- --.

Column 42, line 63 : "otherpolyvinyl" should be --other polyvinyl--

Column 44, line 1 : before "melt" please insert --in--.

Column 44, line 4 : "Examles" should be --Examples--.

Column 52, line 36 : " discloloration" should be --discoloration--.

Column 55, Table II Example 10, under heading β-Thioalkyl Propionic Acid Ester $(C_{12}H_{25}SC_2H_4COOCH_2)_3C$ should be $(C_{12}H_{25}SC_2H_4COOCH_2)_3C-CH_3$ Column 60, line 30 : "Weathr" should be -- Weather--

Column 60, line 32 : "tensilt" should be --tensile--.

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above—identified patent and that said Letters Patent is hereby corrected as shown below:

Column 72, Example 27:

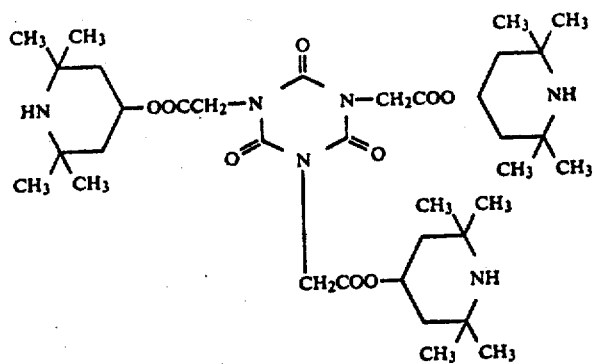

should be

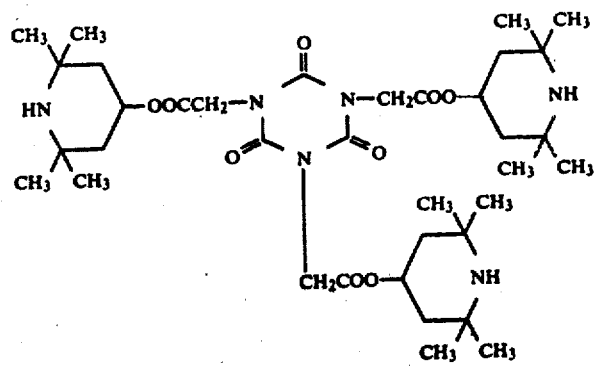

UNITED STATES PATENT AND TRADEMARK OFFICE
CERTIFICATE OF CORRECTION

PATENT NO. : 4,219,463

DATED : August 26, 1980

INVENTOR(S) : Motonobu Minagawa et al

It is certified that error appears in the above—identified patent and that said Letters Patent is hereby corrected as shown below:

Column 79, Table V
Example 32, under heading
Piperidyl Ester :

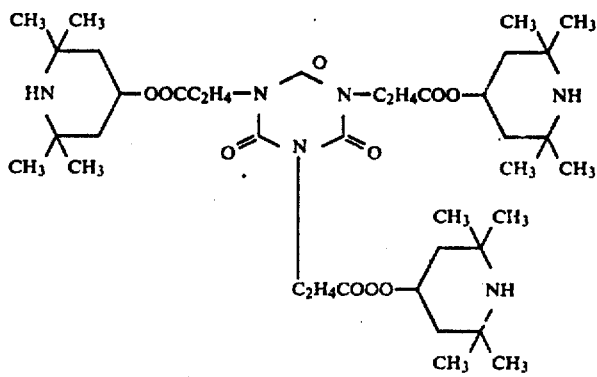

should be

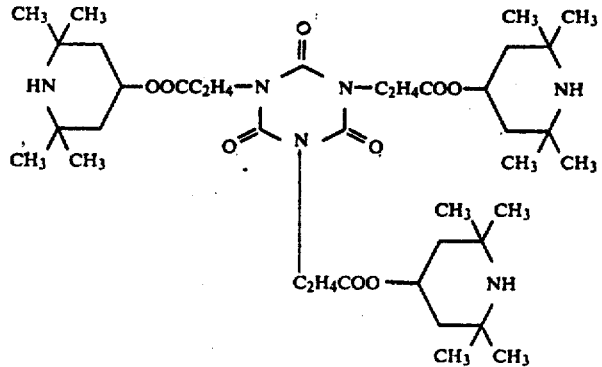

UNITED STATES PATENT AND TRADEMARK OFFICE
CERTIFICATE OF CORRECTION

PATENT NO. : 4,219,463
DATED : August 26, 1980
INVENTOR(S) : Motonobu Minagawa et al It is certified that error appears in the above—identified patent and that said Letters Patent is hereby corrected as shown below:

Column 92, line 13: "mold" should be --molded--.
Column 97, line 56: "O" should be --O$^\cdot$--.
Column 101, line 6: "polyinyl" should be --polyvinyl--.
Column 101, line 66: "O." should be --O$^\cdot$--.
Column 102, line 20: alkenyl" should be --cycloalkalkenyl--.
Column 103, line 18: "O·" should be --O$^\cdot$--.
Column 104, line 34: "O·" should be --O$^\cdot$--.
Column 104, line 61: "coposition" should be --composition--.
Column 105, line 43: "O·" should be --O$^\cdot$--.
Column 106, line 52: "O·" should be --O$^\cdot$--.
Column 107, line 63: "O·" should be --O$^\cdot$--.

Signed and Sealed this

Eighth Day of December 1981

[SEAL]

Attest:

GERALD J. MOSSINGHOFF

Attesting Officer    Commissioner of Patents and Trademarks